US012187070B2

(12) United States Patent
Lambertson, Jr. et al.

(10) Patent No.: US 12,187,070 B2
(45) Date of Patent: Jan. 7, 2025

(54) COATING MATERIAL CONTAINER

(71) Applicant: SWIMC LLC, Cleveland, OH (US)

(72) Inventors: Michael C. Lambertson, Jr., Aurora, OH (US); Joshua R. Robertson, North Ridgeville, OH (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 18/079,936

(22) Filed: Dec. 13, 2022

(65) Prior Publication Data

US 2023/0111318 A1 Apr. 13, 2023

Related U.S. Application Data

(63) Continuation of application No. 16/801,815, filed on Feb. 26, 2020, now Pat. No. 11,565,544.

(Continued)

(51) Int. Cl.

*B65D 25/28* (2006.01)
*B44D 3/12* (2006.01)
*B65D 25/32* (2006.01)

(52) U.S. Cl.

CPC ............ *B44D 3/121* (2013.01); *B44D 3/128* (2013.01); *B65D 25/2832* (2013.01); *B44D 3/126* (2013.01); *B65D 25/32* (2013.01)

(58) Field of Classification Search

CPC . B44D 3/126; B44D 3/121; B44D 3/12; A47J 47/18; B65D 21/045; B65D 25/2832; B65D 25/2802; B65D 25/2829

(Continued)

(56) References Cited

U.S. PATENT DOCUMENTS 300,536 A * 6/1884 Roy .......................... E04B 1/49 411/464
2,195,028 A * 3/1940 Finkelstein ............ A45C 13/26 16/405

(Continued)

FOREIGN PATENT DOCUMENTS

CA 2422885 A1 3/2002
CA 2516892 A1 4/2006

(Continued)

OTHER PUBLICATIONS

Office Action from corresponding Chinese Application No. 202080014597.9 mailed on Dec. 27, 2022, 9 pages.

(Continued)

*Primary Examiner* — Mollie Impink
(74) *Attorney, Agent, or Firm* — Tucker Ellis LLP

(57) ABSTRACT

Provided is a container having a container body, a bail attached to the container body, and a flexible band attached to a rear of the container body. The flexible band has a first end attached to the rear of the container proximate a top of the rear and a second end attached to the rear of the container body proximate a bottom of the rear. The flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user's hand between the rear of the container body and the flexible band.

17 Claims, 18 Drawing Sheets

Related U.S. Application Data

(60) Provisional application No. 62/812,418, filed on Mar. 1, 2019.

(58) Field of Classification Search
USPC .................................. 220/570, 757; 206/507
See application file for complete search history.

(56) References Cited

U.S. PATENT DOCUMENTS

| | | | |
|---|---|---|---|
| 2,277,739 | A | 3/1942 | Worthington |
| 4,002,386 | A | 1/1977 | McKenzie |
| D245,450 | S | 8/1977 | Donlon |
| 4,101,046 | A | 7/1978 | Puntillo |
| 5,341,969 | A | 8/1994 | Accardo et al. |
| D364,017 | S | 11/1995 | Moffitt |
| 5,549,216 | A | 8/1996 | Scholl |
| RE35,933 | E | 10/1998 | Scholl |
| 6,102,458 | A | 8/2000 | Scace |
| 6,138,963 | A | 10/2000 | Malvasio |
| 6,220,491 | B1 | 4/2001 | Wu |
| D444,929 | S | 7/2001 | Cox |
| 6,394,304 | B1 | 5/2002 | Bohne et al. |
| D458,723 | S | 6/2002 | Malvasio |
| D460,845 | S | 7/2002 | Bergman |
| 6,419,106 | B1 | 7/2002 | Bebak |
| D461,608 | S | 8/2002 | Davenport et al. |
| 6,530,496 | B2 | 3/2003 | Moran |
| D472,684 | S | 4/2003 | Bebak |
| 6,708,838 | B2 | 3/2004 | Bergman et al. |
| 6,729,665 | B1 | 5/2004 | Posey et al. |
| 6,991,829 | B2 | 1/2006 | Bergman |
| 7,191,913 | B2 | 3/2007 | Byrne |
| 7,387,323 | B1 | 6/2008 | Minnette et al. |
| D581,118 | S | 11/2008 | Bergman |
| 7,527,164 | B1 | 5/2009 | Reichborn |
| D604,471 | S | 11/2009 | Bergman |
| 7,644,835 | B2 | 1/2010 | Bergman |
| D617,517 | S | 6/2010 | Bergman |
| D627,119 | S | 11/2010 | Bergman |
| D634,907 | S | 3/2011 | Bergman |
| 7,959,030 | B2 | 6/2011 | Bergman |
| 8,087,554 | B2 | 1/2012 | Gringer et al. |
| D661,855 | S | 6/2012 | Bergman et al. |
| 8,286,825 | B2 | 10/2012 | Billado, Jr. |
| 8,308,341 | B2 | 11/2012 | Garcia |
| 8,333,300 | B2 | 12/2012 | Diaz |
| D678,638 | S | 3/2013 | Bergman et al. |
| 8,505,788 | B2 | 8/2013 | Thibault |
| D690,482 | S | 9/2013 | Bergman et al. |
| 8,550,285 | B2 | 10/2013 | Bergman et al. |
| 8,556,116 | B2 | 10/2013 | Bergman et al. |
| 8,608,019 | B2 | 12/2013 | Wren |
| D697,281 | S | 1/2014 | Bergman et al. |
| 8,636,171 | B1 | 1/2014 | Dattilo |
| D702,907 | S | 4/2014 | Bergman et al. |
| 8,919,604 | B2 | 12/2014 | Bergman et al. |
| 9,022,253 | B2 | 5/2015 | Oster |
| D738,057 | S | 9/2015 | Arvinte et al. |
| D744,186 | S | 11/2015 | Gringer et al. |
| D744,711 | S | 12/2015 | Gringer et al. |
| D761,511 | S | 7/2016 | Malvasio |
| 9,409,200 | B2 | 8/2016 | Bergman et al. |
| 9,415,901 | B2 | 8/2016 | Beckman et al. |
| D783,917 | S | 4/2017 | Gringer et al. |
| D794,892 | S | 8/2017 | Bergman et al. |
| 10,266,306 | B2 | 4/2019 | Bergman |
| 2003/0094460 | A1 | 5/2003 | Findleton |
| 2003/0184103 | A1 | 10/2003 | Cauchy |
| 2004/0206761 | A1 | 10/2004 | Frantz |
| 2006/0065668 | A1 | 3/2006 | Whitaker et al. |
| 2006/0175362 | A1 | 8/2006 | Gringer et al. |
| 2006/0201951 | A1 | 9/2006 | Cingel |
| 2006/0225959 | A1 | 10/2006 | Pohl |
| 2006/0226154 | A1 | 10/2006 | Lundy et al. |
| 2006/0243732 | A1 | 11/2006 | Bergman |
| 2007/0012705 | A1 | 1/2007 | Bergman |
| 2007/0295768 | A1 | 12/2007 | Gringer et al. |
| 2008/0223810 | A1 | 9/2008 | Garcia |
| 2008/0251525 | A1 | 10/2008 | Fontaine et al. |
| 2010/0140275 | A1 | 6/2010 | Billado, Jr. |
| 2011/0163104 | A1 | 7/2011 | Hagen |
| 2011/0315700 | A1 | 12/2011 | Macdonald et al. |
| 2013/0119064 | A1 | 5/2013 | MacKay et al. |
| 2013/0175281 | A1 | 7/2013 | Dattilo |
| 2013/0341341 | A1 | 12/2013 | Giedroyce |
| 2014/0008377 | A1 | 1/2014 | Findleton |
| 2014/0043732 | A1 | 2/2014 | McKay et al. |
| 2015/0217595 | A1 | 8/2015 | Piatek et al. |
| 2015/0298496 | A1 | 10/2015 | Payne |
| 2016/0101646 | A1* | 4/2016 | Kiceniuk ............... B44D 3/121 206/229 |
| 2016/0229591 | A1 | 8/2016 | Bajuyo |
| 2017/0057697 | A1 | 3/2017 | Fee et al. |
| 2017/0113838 | A1 | 4/2017 | Bergman |
| 2017/0129277 | A1 | 5/2017 | Rogowski et al. |
| 2017/0253380 | A1 | 9/2017 | Boyer et al. |
| 2018/0043731 | A1 | 2/2018 | Cheng |
| 2018/0043732 | A1 | 2/2018 | Gringer et al. |
| 2019/0217991 | A1 | 7/2019 | Bergman et al. |

FOREIGN PATENT DOCUMENTS

| | | | |
|---|---|---|---|
| CA | 2522230 | A1 | 4/2006 |
| CA | 2800164 | A1 | 4/2006 |
| CA | 2800172 | A1 | 4/2006 |
| CA | 2508552 | A1 | 10/2006 |
| CA | 2959636 | A1 | 9/2017 |
| CN | 1227817 | A | 9/1999 |
| CN | 101024430 | A | 8/2007 |
| CN | 104291001 | A | 1/2015 |
| CN | 205686757 | U | 11/2016 |
| CN | 107149360 | A | 9/2017 |
| CN | 208248922 | U | 12/2018 |
| DE | 60127156 | T2 | 11/2007 |
| EP | 1792834 | A2 | 6/2007 |
| EP | 2565049 | A1 | 6/2013 |
| EP | 3213655 | A1 | 9/2017 |
| GB | 881203 | A | 11/1961 |
| GB | 1190428 | A | 5/1970 |
| GB | 2404608 | A | 9/2005 |
| WO | 9118810 | A1 | 12/1991 |
| WO | 0027719 | A1 | 5/2000 |
| WO | 0224537 | A1 | 3/2002 |
| WO | 2010036606 | A1 | 4/2010 |

OTHER PUBLICATIONS

Manufacturer Bercom, https://www.amazon.com/Paint-Gallon-Paint-Accomodates-Mini-Roller/dp/B01C4918EG captured Mar. 11, 2022 (Year: 2016).

https://www.amazon.com/vdp/ae9fba4220194dd6931b2c1c354dd230?ref=dp_vse_rvc_0 video clips captured from the above amazon website Mar. 11, 2022, (Year: 2016).

* cited by examiner

COATING MATERIAL CONTAINER

RELATED APPLICATIONS

This application is a continuation of U.S. patent application Ser. No. 16/801,815 filed on Feb. 26, 2020, which claims priority to and the benefit of U.S. Provisional Application Ser. No. 62/812,418 filed on Mar. 1, 2019, the entirety of which are incorporated herein by reference.

BACKGROUND

Containers can be provided for holding a coating material, such as paint. The containers can include a handle for a painter to hold. The container can be smaller than a traditional paint container, such as a paint can, to provide a lighter weight and easier to hold container for the painter.

TECHNICAL FIELD

Embodiments of the subject matter disclosed herein relate to a container, and more particularly to a container for a coating material.

BRIEF DESCRIPTION

In an embodiment, a container is provided that includes a container body having a front, a rear, a right side, a left side, and a bottom that define a cavity for receiving a coating material, a bail attached to the container body, and a flexible band attached to the rear of the container body, the flexible band having a first end attached to the rear of the container body proximate a top of the rear and a second end attached to the rear of the container body proximate a bottom of the rear, wherein the flexible band is movable between a first position spaced a first distance from the rear, a second position spaced a second distance from the rear less than the first distance to allow the rear of the container body and the bail to be grasped without interference by the flexible band, and a third position spaced a third distance from the rear greater than the first distance to provide space for a user's hand between the rear of the container body and the flexible band.

In another embodiment, a container for holding a coating material is provided. The container includes a container body having a front, a rear, a right side, a left side, and a bottom that define a cavity for receiving a coating material, the right side and left side each including an inwardly extending portion that extends into the cavity and define with one another a ledge for holding a painting apparatus above a level of the coating material in the cavity, a bail attached to the container body, and a flexible band attached to the rear of the container body, the flexible band having a first end attached to the rear of the container body proximate a top of the rear and a second end attached to the rear of the container body proximate a bottom of the rear.

In still another embodiment, a method for holding a container for a coating material is provided. The container includes a container body having a front, a rear, a right side, a left side, and a bottom that define a cavity for receiving the coating material, a bail attached to the container body and movable between a first position extending above the cavity, a second position behind the rear, and a third position in front of the front, and a flexible band attached to a rear of the container body and movable between a first position spaced a first distance from the rear, a second position spaced a second distance from the rear less than the first distance, and a third position spaced a third distance from the rear greater than the first distance. The method includes moving the flexible band to the second position adjacent the rear of the container and moving the bail to the second position behind the rear and holding the container body and bail at the rear without interference by the flexible band, or moving the flexible band to the third position and holding the container body and bail at the front, or moving the flexible band to the third position and inserting the user's fingers between the flexible band and the rear of the container body.

BRIEF DESCRIPTION OF THE DRAWINGS

Reference is made to the accompanying drawings in which particular embodiments and further benefits of the provided subject matter are illustrated as described in more detail in the description below.

DETAILED DESCRIPTION

Figure 1:
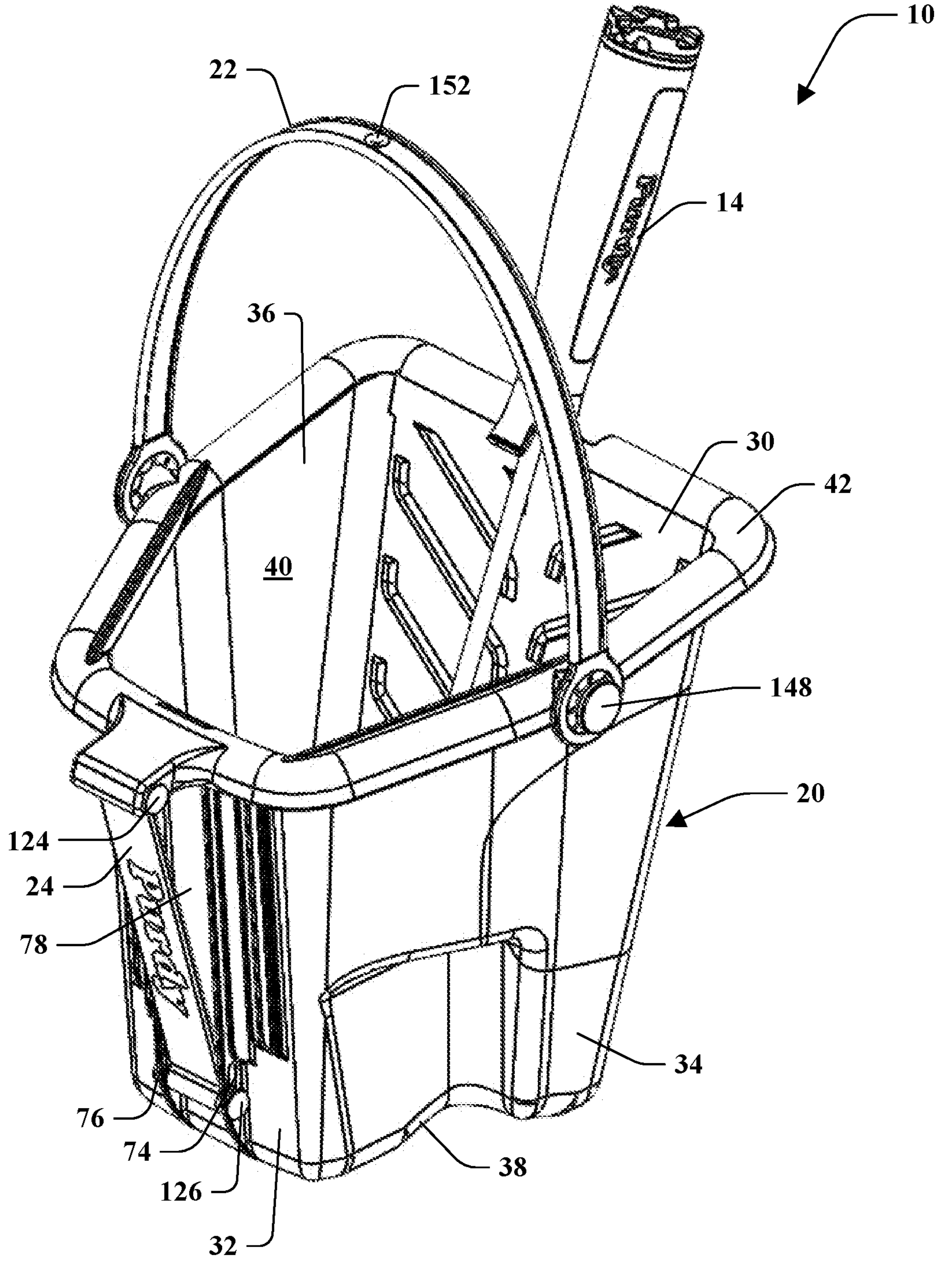
FIG. 1 is a rear perspective view of an exemplary container with a roller positioned in the container and a bail and band in respective first positions.

Embodiments of the provided subject matter relate to a container and methods of holding the container. The container includes a container body, a bail attached to the container body, and a flexible band attached to the container body. The flexible band is movable between a first position spaced a first distance from a rear of the container body, a second position spaced a second distance from the rear less than the first distance to allow the rear of the container body and the bail to be grasped without interference by the flexible band, and a third position spaced a third distance from the rear greater than the first distance to provide space for a user's hand between the rear of the container body and the flexible band.

With reference to the drawings, like reference numerals designate identical or corresponding parts throughout the several views. However, the inclusion of like elements in different views does not mean a given embodiment necessarily includes such elements or that all embodiments of the invention include such elements.

Figure 2:
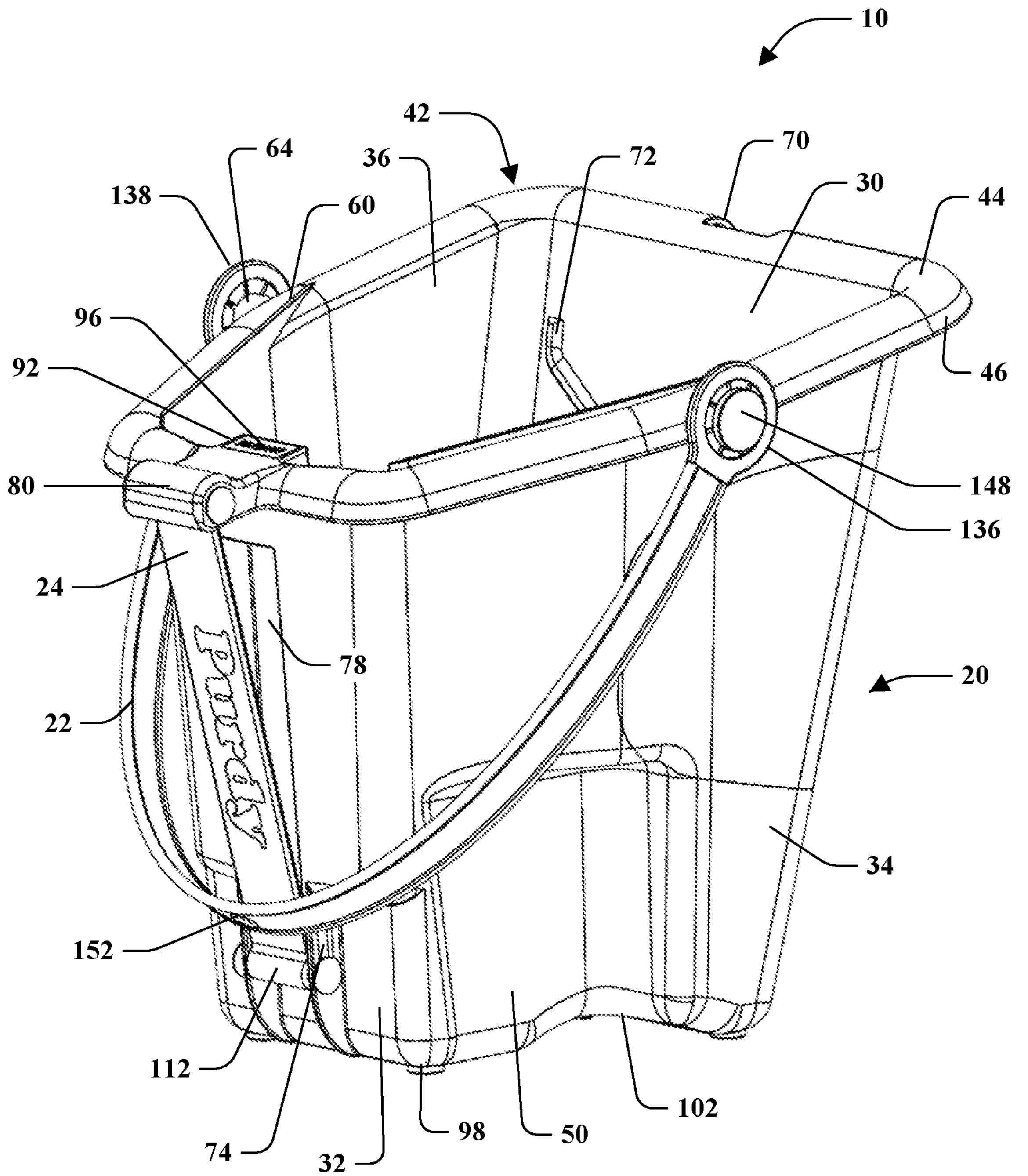
FIG. 2 is a perspective view of the container with the bail in a second position.

Referring now to FIGS. 1 and 2, an exemplary container is shown at reference numeral 10. The container 10 is provided for holding a coating material, such as paint, and can receive/secure suitable painting implements, such as a brush, a roller 14, etc. The container 10 includes a container body 20, a bail 22 attached to the container body 20, and a flexible band 24 attached to the container body 20. The container body 20 includes a front 30, a rear 32, a right side 34, a left side 36, and a bottom 38 that define a cavity 40 for receiving the coating material. The front 30, rear 32, right side 34, and left side 36 each include a rim portion extending around tops thereof that is collectively referred to herein as an upper rim 42. The upper rim 42 includes a horizontal portion 44 and a downwardly projecting portion 46 outwardly spaced from the container body. The front, rear, right side, and left side form an irregular hexagon shape at their tops, with the left and right sides each having a substantially parallel portion and an angled portion angling in towards the rear, although it will be appreciated that the container body 20 may have any suitable shape.

Turning additionally to FIGS. 5-9, the right side 34 and left side 36 each include an inwardly extending portion 50, 52 proximate bottoms thereof that extend into the cavity 40 and define a ledge 54, 56 in the cavity 40 for holding the roller 34 above a level of the coating material in the cavity 40. The inwardly extending portions 50 and 52 also provide an area of reduced width along an outside of the container 10 such that a user can grasp in one hand the right side 34 and left side 36 at the inwardly extending portions 50 and 52 to hold the container as shown for example in FIG. 15. The area of reduced width has a width W1 between the right and left sides proximate the rear 32 that is less than a width W2 between the right and left sides proximate the front. Similarly, the cavity 40 a width W3 at the inwardly extending portions 50 and 52 of the left and rights sides that is less than a width W4 of the cavity between the left and right sides proximate the front of the container body. A user can hold the container 10 by the inwardly extending portions 50 and 52, for example by grasping one of the inwardly extending portions 50 or 52 with the user's fingers and grasping the other of the inwardly extending portion 50 or 52 with the user's thumb.

The right side 34 and left side 36 of the container 10 additionally include angled fronts where the sides meet the front 30 such that tops of the sides have a greater length than bottoms of the sides, bars 58 and 60 projecting upward from tops of the sides 34 and 36 that define regions to wipe off coating material on the brush so that the coating material can reenter the cavity 40, and ears 62 and 64 projecting outward from the sides to which the bail 22 is attached. As shown, the bars 58 and 60 project upward from the rim portions of the right and left sides 34 and 36 near the angled portions of the sides 34 and 36 and the ears 62 and 64 project outward from the rim portions in a direction perpendicular the bars 58 and 60.

The front 30 of the container 10 is angled corresponding to the angle of the front of the left and right sides 34 and 36. The front 30 includes a slot 70 for receiving a ledge of a painting apparatus, such as a handle of the roller 14 as shown in FIG. 1 to hold the roller 14 in position when a cover of the roller is disposed in the cavity 40 on the ledges 54 and 56. As shown, the slot 70 is provided in the rim portion of the front 30. An inner surface of the front 30 includes a plurality of scraper regions 72 projecting therefrom for scraping paint off of a painting apparatus, such as the roller 14.

Figure 12:
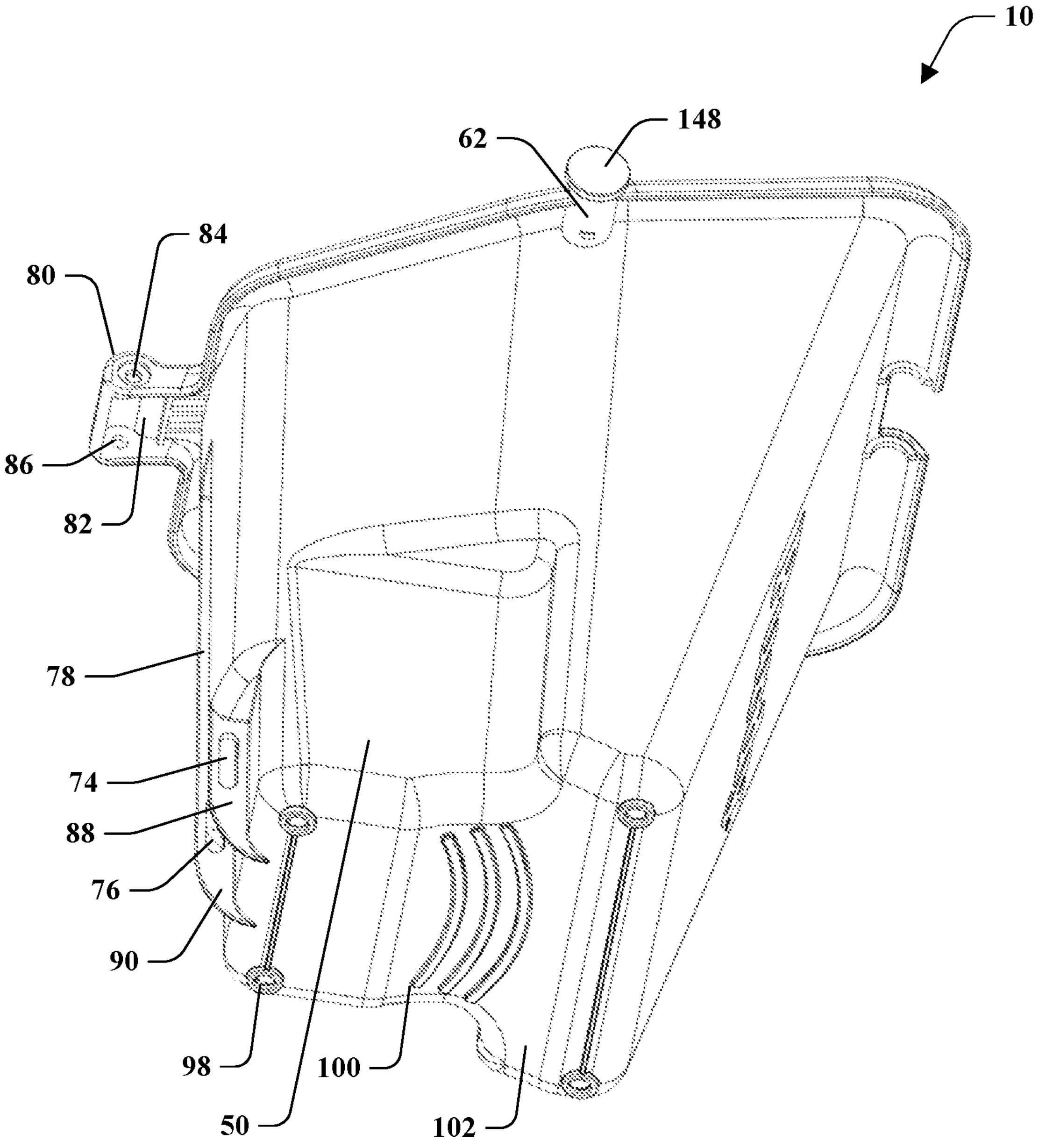
FIG. 12 is a rear bottom perspective of the container.

Turning additionally to FIG. 12, the rear 32 of the container 10 includes a pair of opposed slots 74 and 76 proximate the bottom 38, a channel 78 extending substantially along the rear 32 for receiving the flexible band 24, and a projection 80 projecting rearwardly from the rear 32 that provides a surface for a user's thumb to rest, for example when the container 10 is being held with the user's hand between the container body 20 and the flexible band 24. The projection 80 defines a cavity 82 for receiving an end of the flexible band 24, and includes openings 84 and 86 at opposite ends thereof for attachment of the flexible band 24 to the projection 80 as will be described in detail below. As shown, the slots 74 and 76 are in respective projections 88 and 90 that project from the rear 32 proximate the bottom 38 and the projection 80 projects from the rim portion of the rear 32. The container 10 can additionally include a projection 92 projecting forwardly from the rear 32 into the cavity 40. The projection 92 defines a cavity for housing a magnet 96 for supporting the brush. The cavity may be sealed at the top preventing removal of the magnet 96 or sealed by the magnet.

The bottom 38 of the container 10 is substantially T-shaped due to the inwardly extending portions 50 and 52. Projecting downward from the bottom 38 may be a plurality of feet 98, such as at corners of the bottom 38, and one or more projecting ribs 100 that project from a curved portion 102 of the bottom providing a fingertip relief grip area.

Turning again to FIGS. 5 and 8, the cavity 40 is substantially T-shaped at and below the ledges 54 and 56 corresponding to the shape of the bottom 38, and has an irregular hexagon shape above the ledges 54 and 56. When coating material is poured into the cavity 40, it initially fills the T-shaped area. The user may stop pouring the coating material prior to reaching the ledges 54 and 56 so that the roller 14 can rest on the ledges above the level of coating material, although it will be appreciated that the coating material could be poured above the ledges if more coating material is desired.

Figure 13:
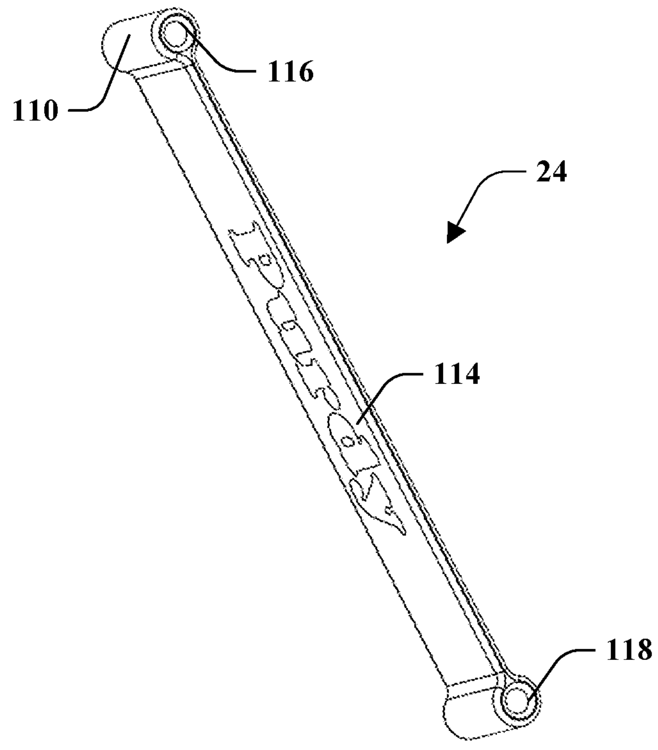
FIG. 13 is a perspective view of the flexible band.

Referring now to FIG. 13 and the flexible band 24 in detail, the flexible band 24 includes a first end 110 configured to be rotatably attached to the rear 32 proximate a top of the rear 32, for example at the projection 80, and a second end 112 configured to be rotatably attached to the rear 32 proximate a bottom of the rear 32, for example at the opposed slots 74 and 76. The flexible band 24 also includes a substantially planar portion 114 disposed between first and second tubular portions 116 and 118 at the first and second ends 110 and 112 respectively. The tubular portions 116 and 118 each include a through passage 120, 122 for receiving a suitable fastener. For example, as shown in FIG. 1, the through passage 120 in the first tubular portion 116 is positioned in the cavity 82 in the projection 80 and aligned with the openings 84 and 86. A pin 124 or other suitable fastener is then inserted through the through passage 120 to attach the first end 110 of the flexible band 24 to the projection 80. Similarly, the through passage 122 in the second tubular portion 118 is positioned between the slots 74 and 76 in the projections 88 and 90 proximate the bottom 38 and a pin 126 or other suitable fastener is inserted through the through passage 122 to attach the second end 112 of the flexible band 24 to the projections 88 and 90. The first end 110 of the flexible band 24 will thereby be rotatably attached to the projection 80, while the second end 112 of the flexible band will be rotatably attached to the projections 88 and 90 and movable within the slots 74 and 76.

Figure 3:
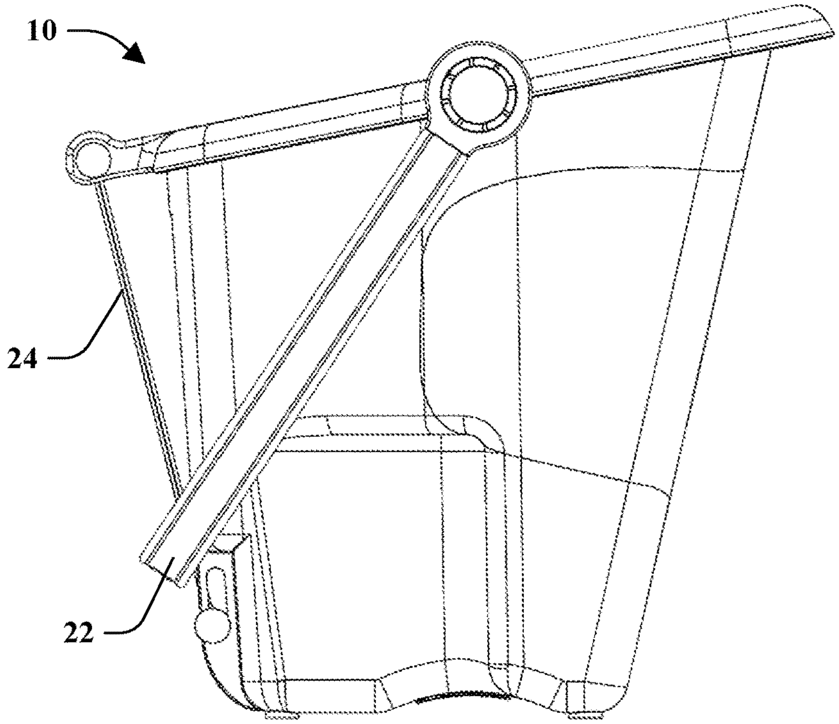
FIG. 3 is a left side view of the container with the band in a second position.
Figure 4:
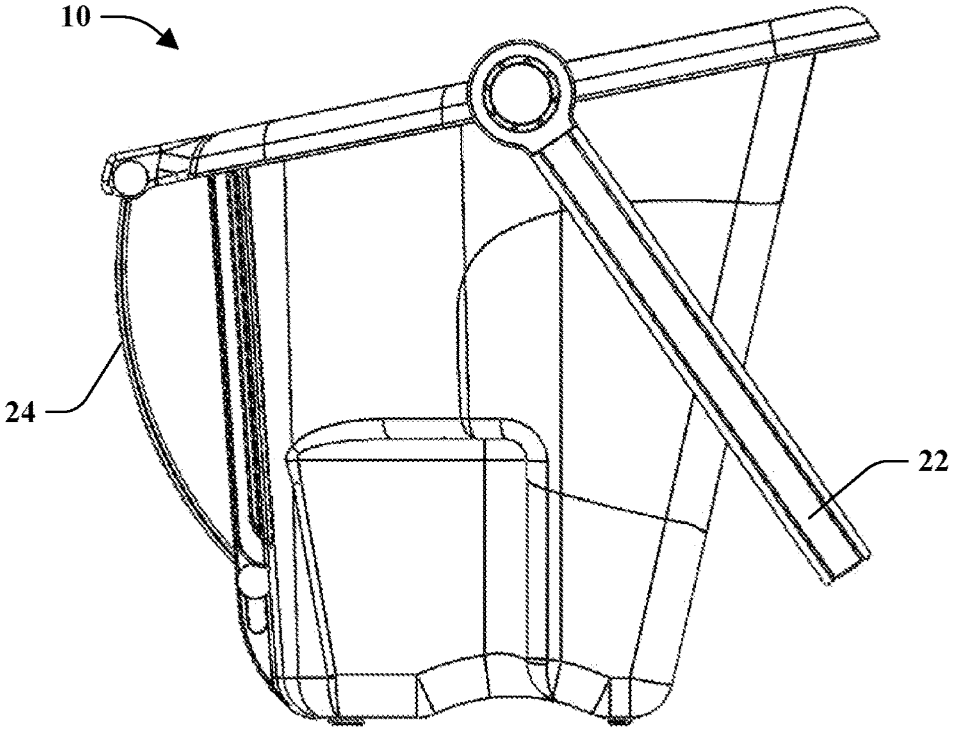
FIG. 4 is a left side view of the container with the band in a third position.
Figure 5:
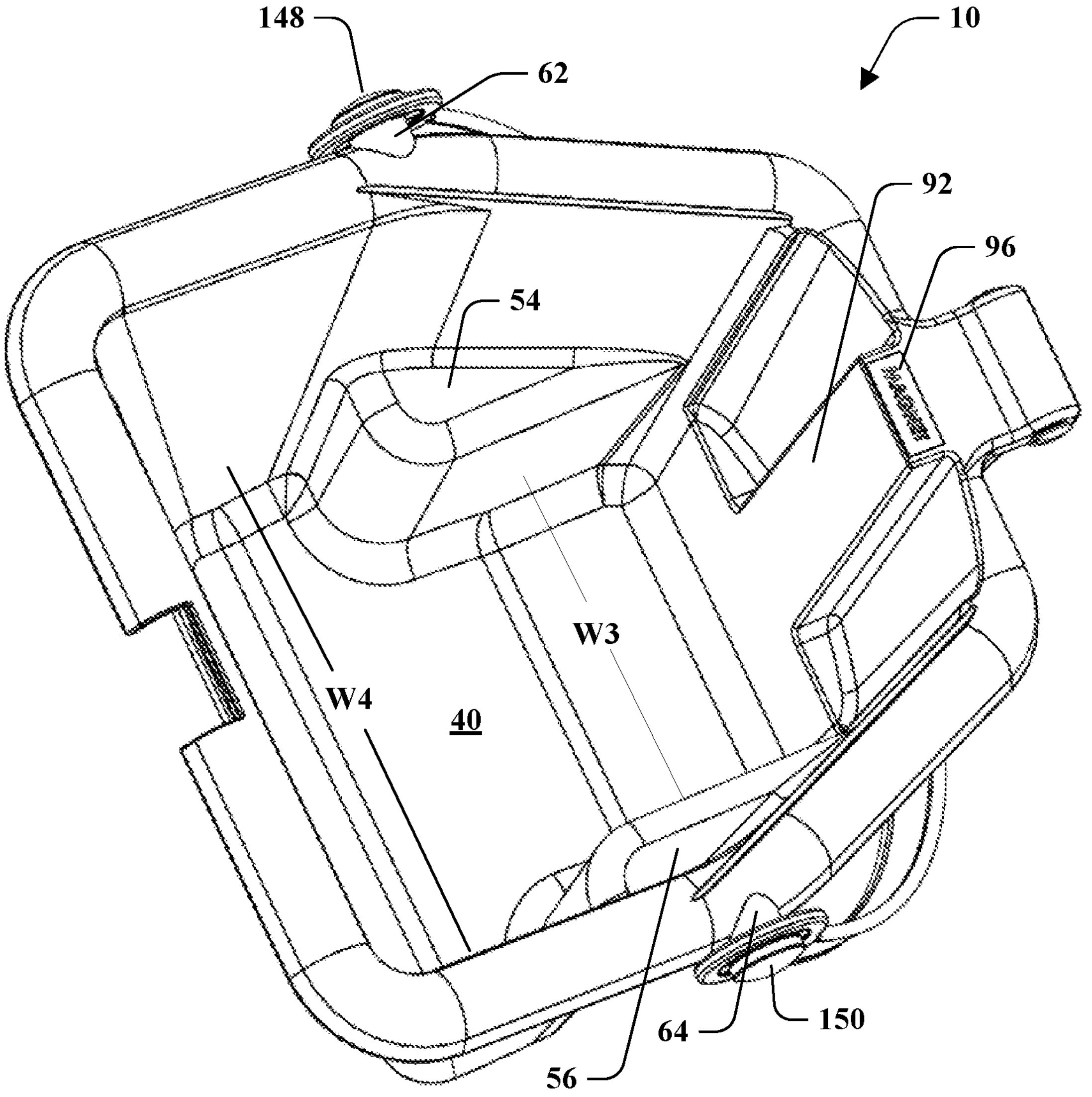
FIG. 5 is another perspective view of the container.
Figure 6:
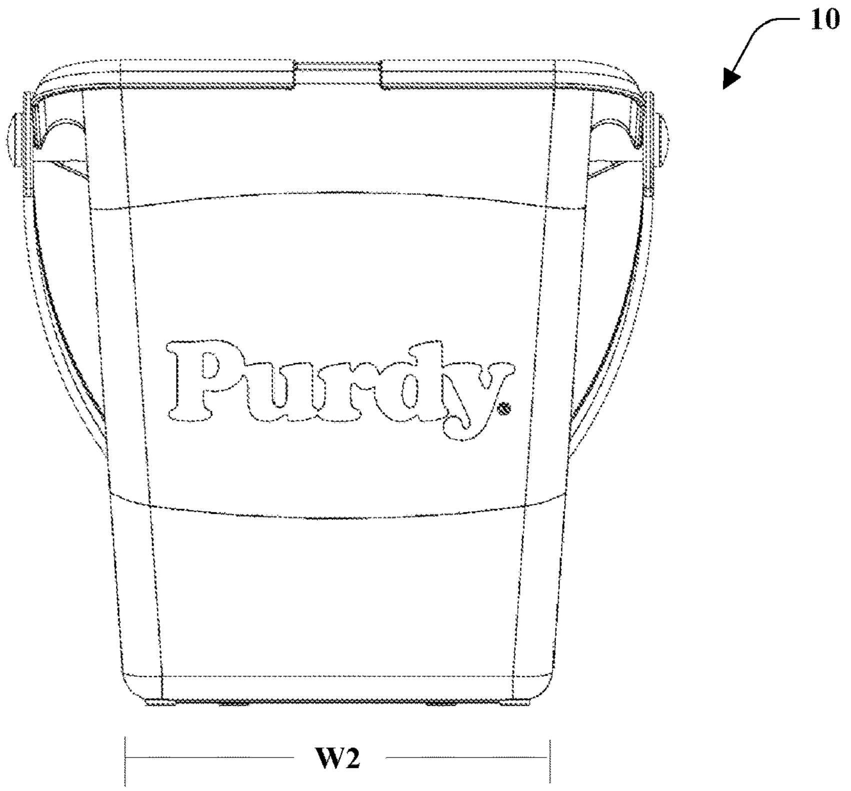
FIG. 6 is a front view of the container.
Figure 7:
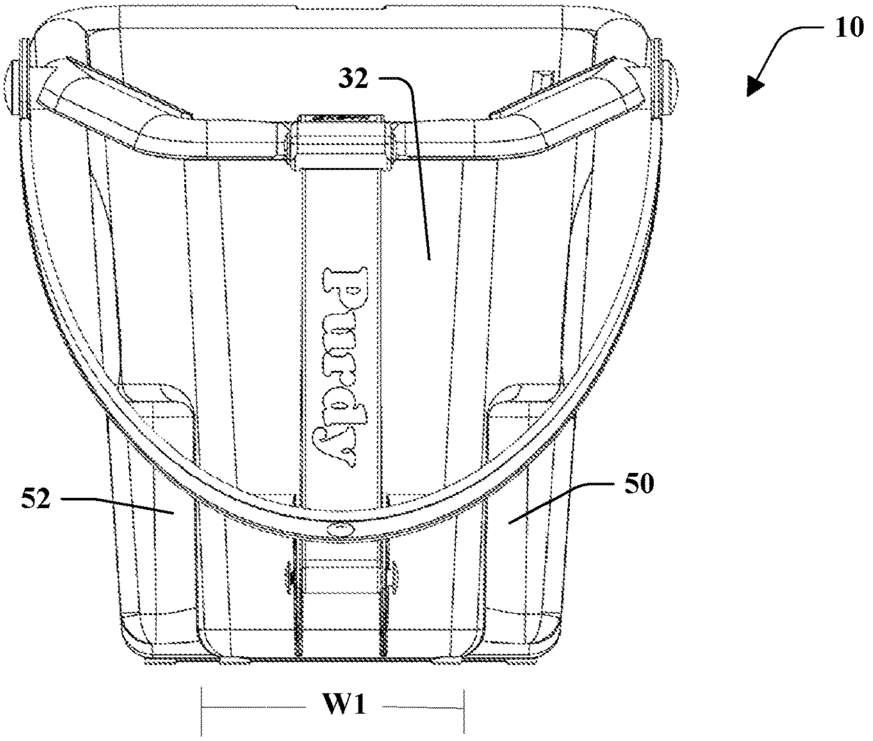
FIG. 7 is a rear view of the container.
Figure 8:
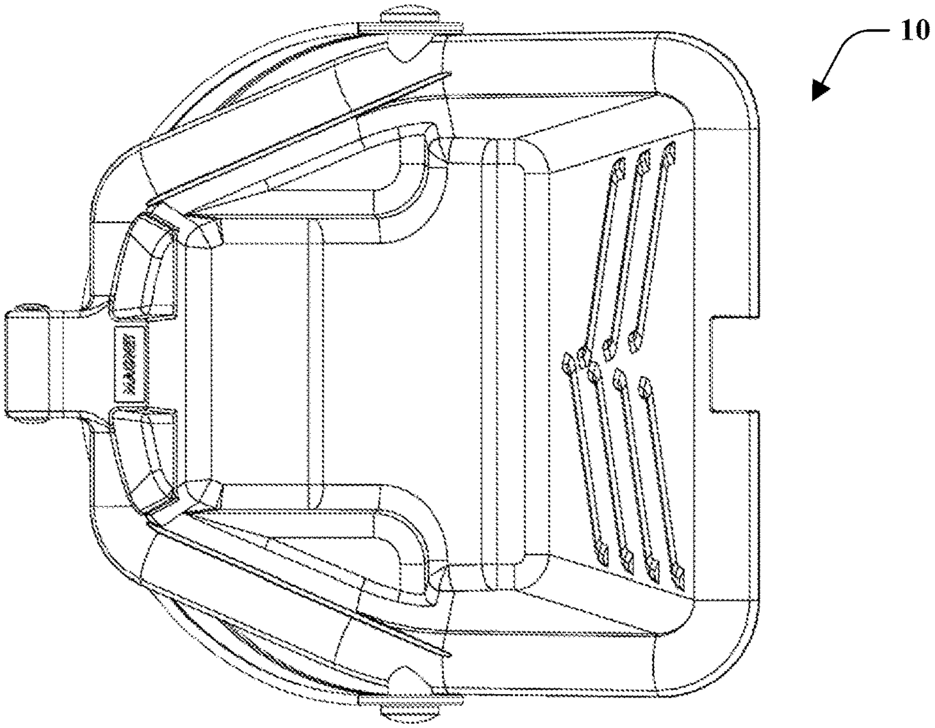
FIG. 8 is a top view of the container.
Figure 9:
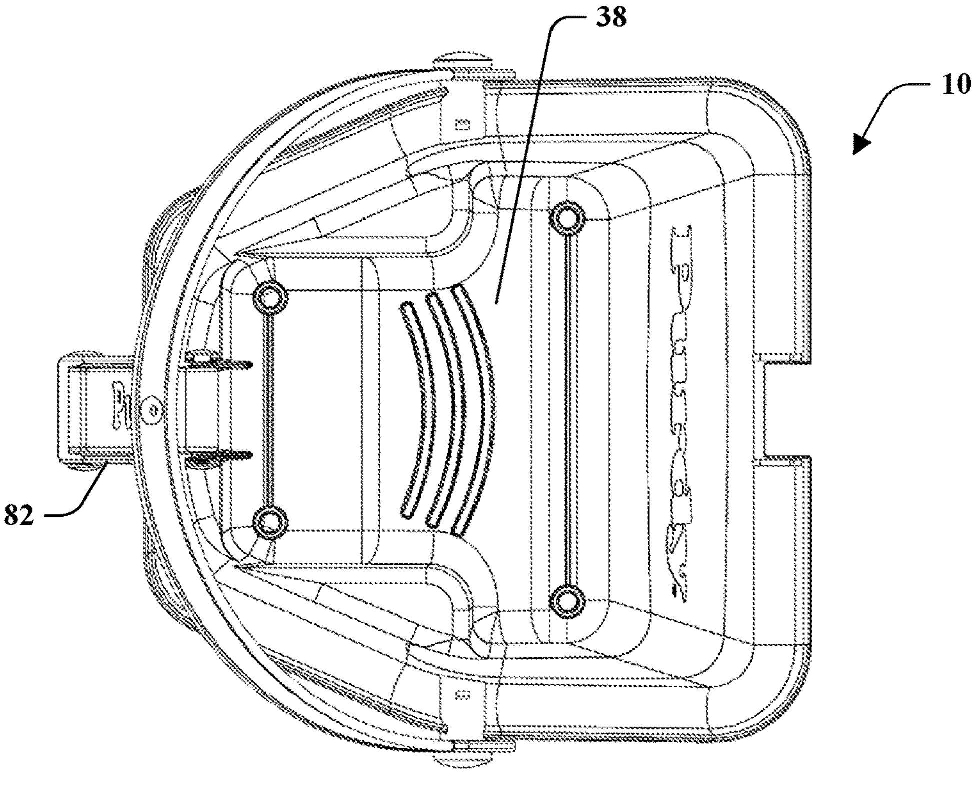
FIG. 9 is a bottom view of the container.
Figure 10:
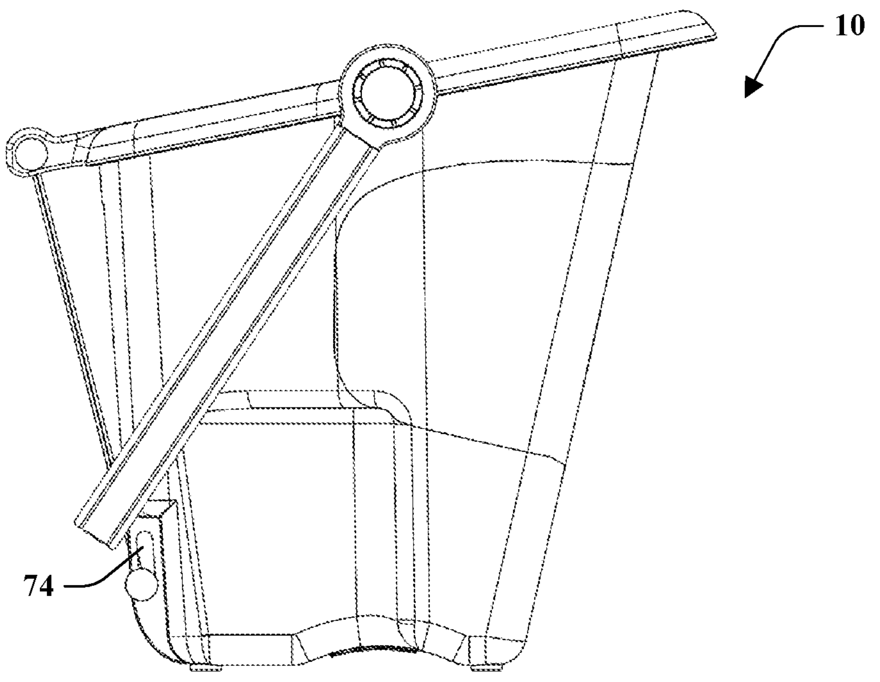
FIG. 10 is a right side view of the container.
Figure 11:
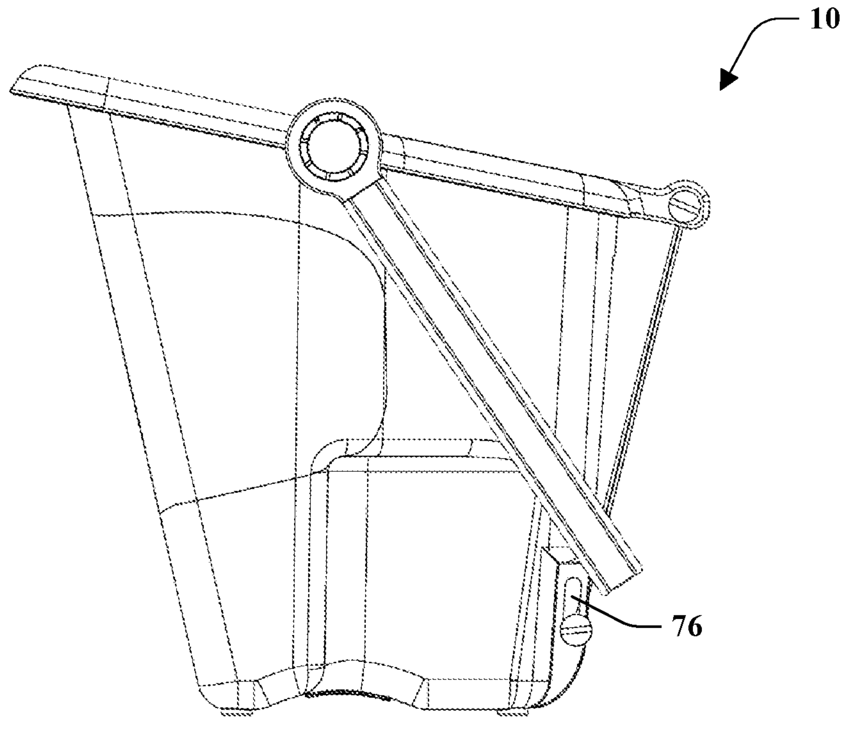
FIG. 11 is a left side view of the container.

The flexible band 24 is movable between a first position spaced a first distance from the rear 32 as shown in FIG. 1, a second position spaced a second distance from the rear 32 less than the first distance to allow the rear 32 of the container body 20 and the bail 22 to be grasped without interference by the flexible band 24 as shown in FIG. 3, and a third position spaced a third distance from the rear 32 greater than the first distance to provide space for a user's hand between the rear 32 of the container body 20 and the flexible band 24 as shown in FIG. 4. As shown in FIG. 1, when the flexible band 24 is in the first position, the second end 112 of the flexible band 24 and the pin 126 are at a bottom of the slots 74 and 76. As shown in FIGS. 3 and 4, when the flexible band 24 is in the second position and the third position respectively, the second end 112 of the flexible band 24 and the pin 126 are at a top of the slots 74 and 76. It will be appreciated that although illustrated as being at the top of the slots 74 and 76, the second end 112 of the flexible band 24 may be at another position, such as at a middle of the slots 74 and 76, for example to adjust for the size of the user's hand.

Figure 15:
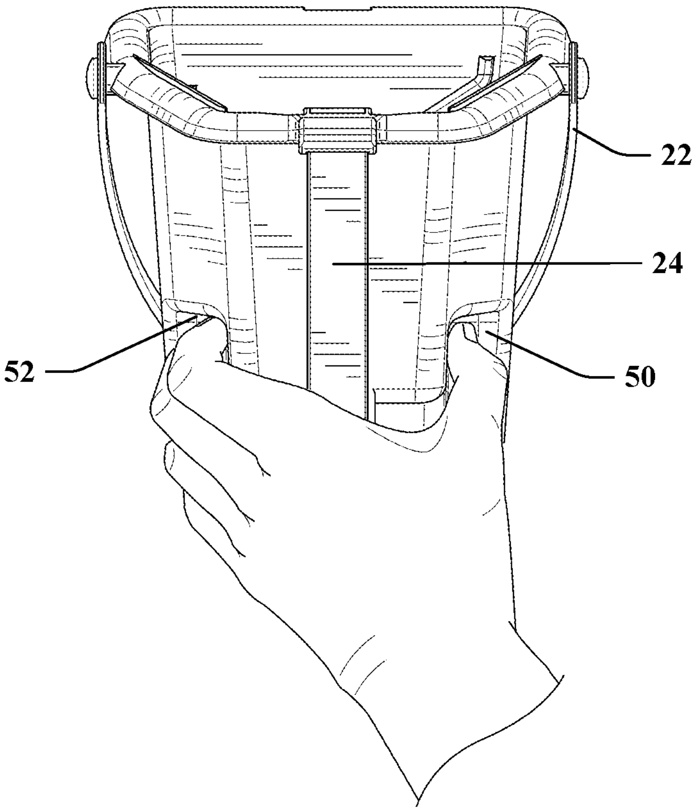
FIG. 15 is a rear perspective view showing the container being held.
Figure 16:
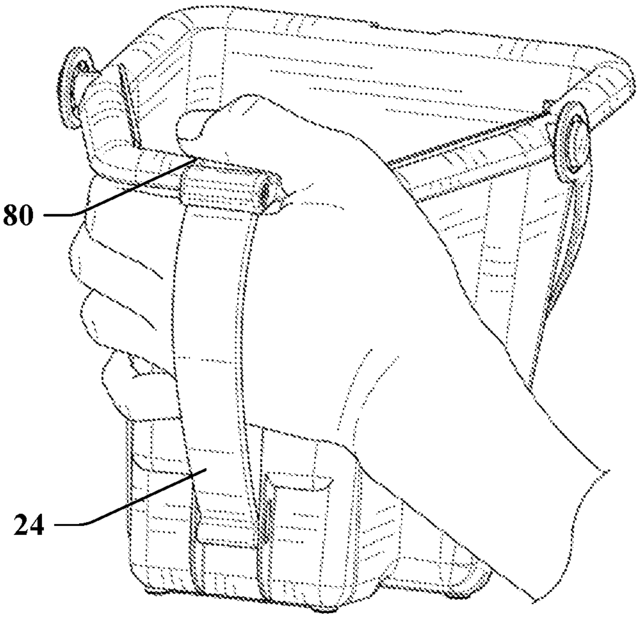
FIG. 16 is another rear perspective view showing the container being held.

When the flexible band 24 is in the second position shown in FIG. 2 and the bail 22 is above or in front of the container body, for example as shown in FIG. 1 or FIG. 4, the user can grasp the container by the inwardly extending portions 50 and 52. For example, the user can grasp the inwardly extending portion 52 with the user's fingers and grasp the inwardly extending portion 50 with the user's thumb as shown in FIG. 15. When the flexible band 24 is in third position shown in FIG. 4, the user can place his/her fingers between the flexible band 24 and the rear 32 of the container body 20, with his/her palm adjacent the rear, and rest his/her thumb on a top of the projection 80 as shown in FIG. 16.

Figure 14:
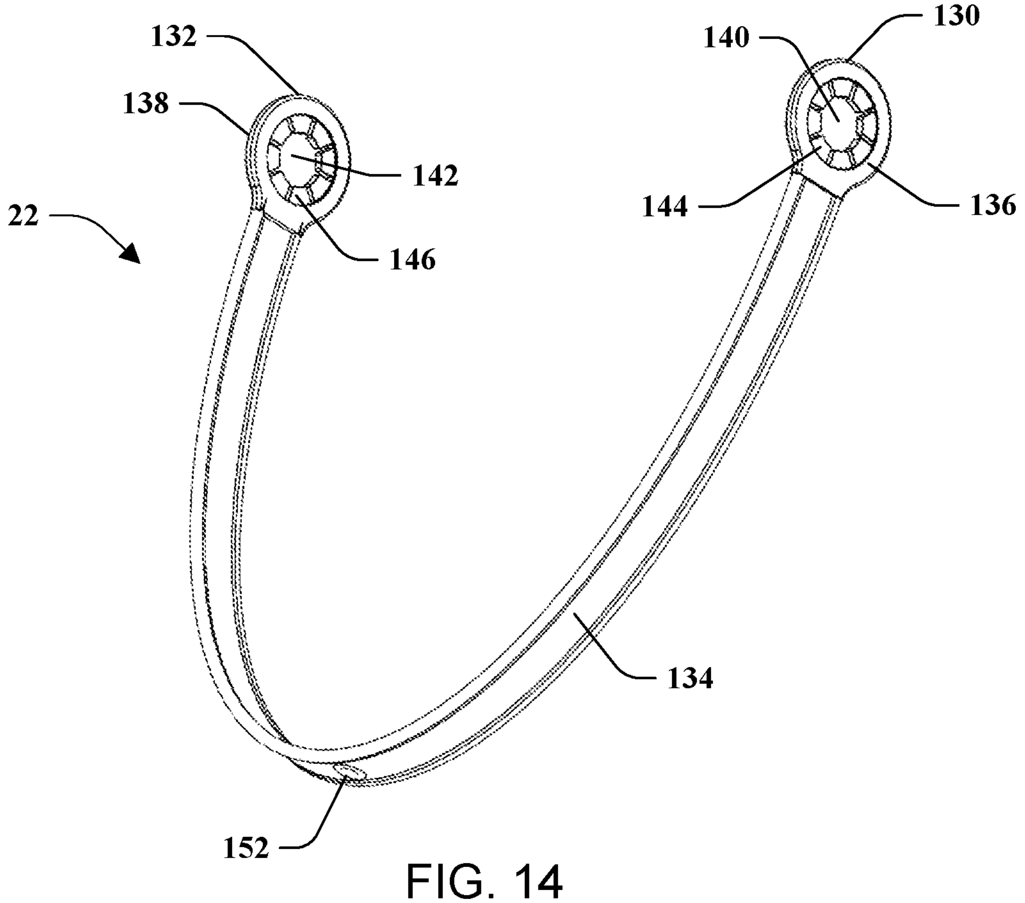
FIG. 14 is a perspective view of the bail.

Referring now to FIG. 14 and the bail 22 in detail, the bail 22 includes a first end 130 configured to be rotatably attached to the ear 62, a second end 132 configured to be rotatably attached to the ear 64, and a body 134 disposed between the first and second ends 130 and 132. The bail also includes attachment portions 136 and 138 at the first and second ends 130 and 132 respectively. The attachment portions 136 and 138 are substantially circular having respective openings 140 and 142 through which the ears 62 and 64 extend. Each attachment portion 136, 138 includes a plurality of circumferentially spaced tabs 144 and 146 surrounding the openings 140 and 142 respectively that are configured to flex to allow the bail 22 to pass over flanges 148 and 150 of the ears 62 and 64 for attachment/removal of the bail 22 to/from the ears 62 and 64. The bail 22 can additionally include an opening 152 in the body 134, as shown proximate a center of the bail 22, which is configured to receive a ladder hook to allow for hanging from a ladder.

The bail 22 is movable between a first position extending above the cavity 40 as shown in FIG. 1 to allow the container 10 to be held by the bail 22, a second position behind the rear 32 of the container 10 as shown in FIG. 3 to allow the container to be held by the bottom 38 and rear 32 and be supported by the bail 22, and a third position in front of the front 30 of the container 10 as shown in FIG. 4 to allow the flexible band 24 to be utilized without interference by the bail 22 or to allow the container to be held by the bottom 38 and front 30 and be supported by the bail 22.

Figure 17:
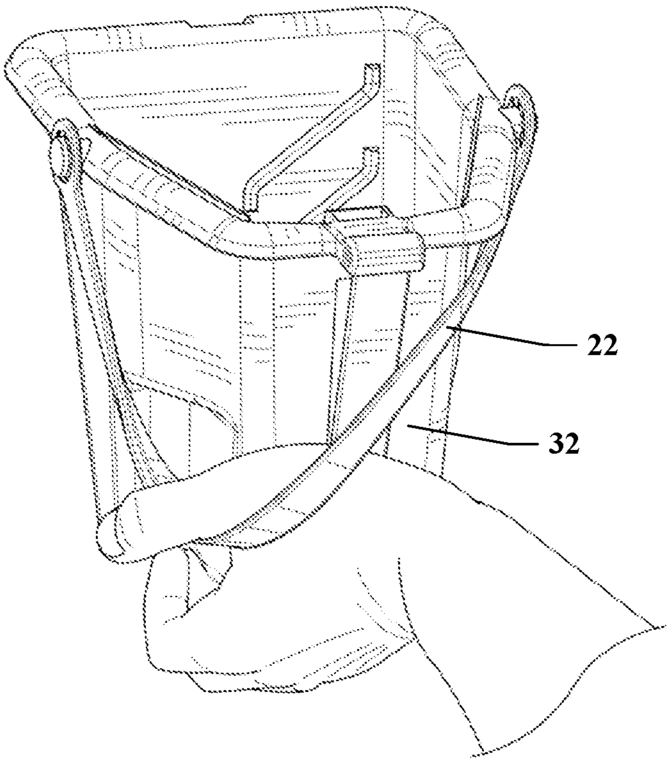
FIG. 17 is a rear left perspective view showing the container being held.
Figure 18:
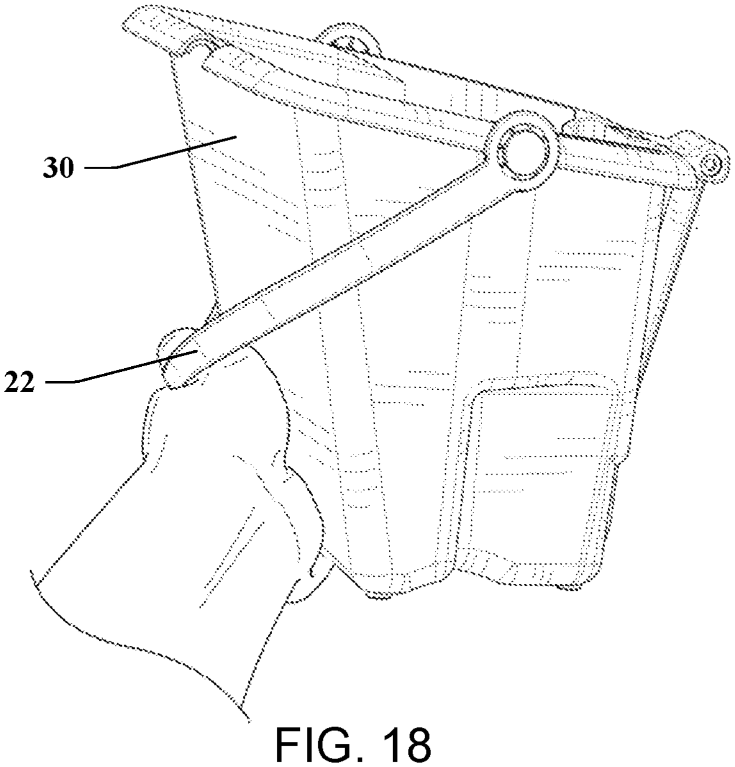
FIG. 18 is a front left perspective view showing the container being held.

When the bail 22 is in the second position shown in FIG. 3, the flexible band 24 can be moved to its second position where the pin 126 is at the top of the slots 74 and 76 and the flexible band 24 flexed into the channel 78 to avoid interference. The user can grasp the container, for example with the user's fingers under the bottom 38 of the container and the user's palm against the rear 32, and hook her thumb around the bail 22 to hold the container 10 against the user's hand as shown in FIG. 17. When the bail 22 is in the third position shown in FIG. 4, the container can be held by the flexible band 24 as discussed above, or the container can be grasped by the user. For example, the user can place her fingers under the bottom 38 of the container and the user's palm against the front 30, and hook her thumb around the bail 22 to hold the container 10 against the user's hand as shown in FIG. 18.

Turning now to FIGS. 19-22, an exemplary embodiment of the container is shown at 210. The container 210 is substantially the same as the above-referenced container 10, and consequently the same reference numerals but indexed by 200 are used to denote structures corresponding to similar structures in the containers. In addition, the foregoing description of the container 10 is equally applicable to the container 210 except as noted below.

The container 210 includes a container body 220, a bail 222 attached to the container body 220, and a flexible band 224 attached to the container body 220. The container body 220 includes a front 230, a rear 232, a right side 234, a left side 236, and a bottom 238 that define a cavity 240 for receiving the coating material. The front 230, rear 232, right side 234, and left side 236 each include a rim portion extending around tops thereof that is collectively referred to herein as an upper rim 242. The upper rim 242 includes a horizontal portion 244 and a downwardly projecting portion 246 outwardly spaced from the container body.

The right side 234 and left side 236 of the container 210 include angled fronts where the sides meet the front 230 such that tops of the sides have a greater length than bottoms of the sides, bars 258 and 260 projecting upward from tops of the sides 234 and 236 that define regions to wipe off coating material on the brush, and ears 262 and 264 projecting outward from the sides to which the bail 222 is attached. The front 230 of the container 210 is angled corresponding to the angle of the front of the left and right sides 234 and 236. The front 230 includes a slot 270 for receiving a ledge of a painting apparatus and an inner surface of the front 230 includes a plurality of scraper regions 272 projecting therefrom for scraping paint off of a painting apparatus. The rear 232 of the container 210 includes a projection 280 projecting rearwardly from the rear 232 that defines a cavity 282 and includes openings 284 at opposite ends thereof for attachment of the flexible band 224 to the projection 280 as will be described in detail below.

Referring now to the flexible band 224 in detail, the flexible band 224 includes a first end 310 configured to be rotatably attached to the rear 232 proximate a top of the rear 232, for example at the projection 280, and a second end 312 configured to be rotatably attached to the rear 232 proximate a bottom of the rear 232. The flexible band 224 also includes a substantially planar portion 314 disposed between the first and second ends 310 and 312. The first and second ends 310 and 312 can be attached to first and second band extenders 360 and 362, respectively, in any suitable manner, which can be attached to the container 10.

The first band extender 360 includes a a tubular portion 366 with a through passage, a body 368 extending from the tubular portion, and ears 370 with openings extending from the body. To attach the band extender 360 to the container 210, the through passage in the tubular portion 366 can be positioned in the cavity 282 and aligned with the openings 284, and a pin 324 or other suitable fastener can be inserted through the through passage to attach the band extender 360 to the projection 280. The band extender 360 can then be attached to the flexible band 224, for example by aligning the ears 370 with a through passage 364 at the first end 310 of the flexible band 224 and inserting a pin 378 or other suitable fastener through the openings in the ears 370 and the through passage of the flexible band.

The second band extender 362 includes a tubular portion 392 with a through passage, a body 394 extending from the tubular portion, and ears 396 with openings extending from the body. To attach the band extender 362 to the container 210, the through passage in the tubular portion 392 can be aligned with openings 400 in the rear or bottom of the container, and a pin 402 or other suitable fastener can be inserted through the through passage to attach the band extender 362 to the container. The band extender 362 can then be attached to the flexible band 224, for example by aligning the ears 396 with a through passage 372 at the second end 312 of the flexible band 224 and inserting a pin 404 or other suitable fastener through the openings in the ears 396 and the through passage of the flexible band. The first end 310 of the flexible band 224 will thereby be rotatably attached to the projection 280, while the second end 312 of the flexible band will be rotatably attached to the container 210.

Figure 21:
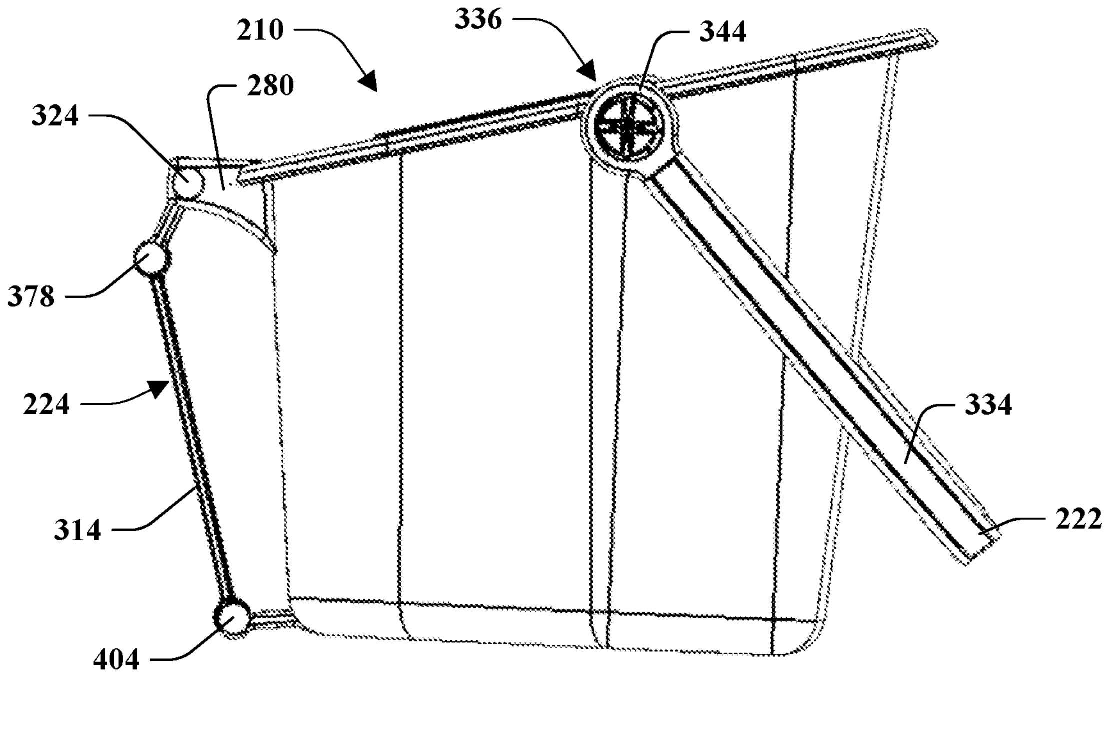
FIG. 21 is a left side view of the container.
Figure 22:
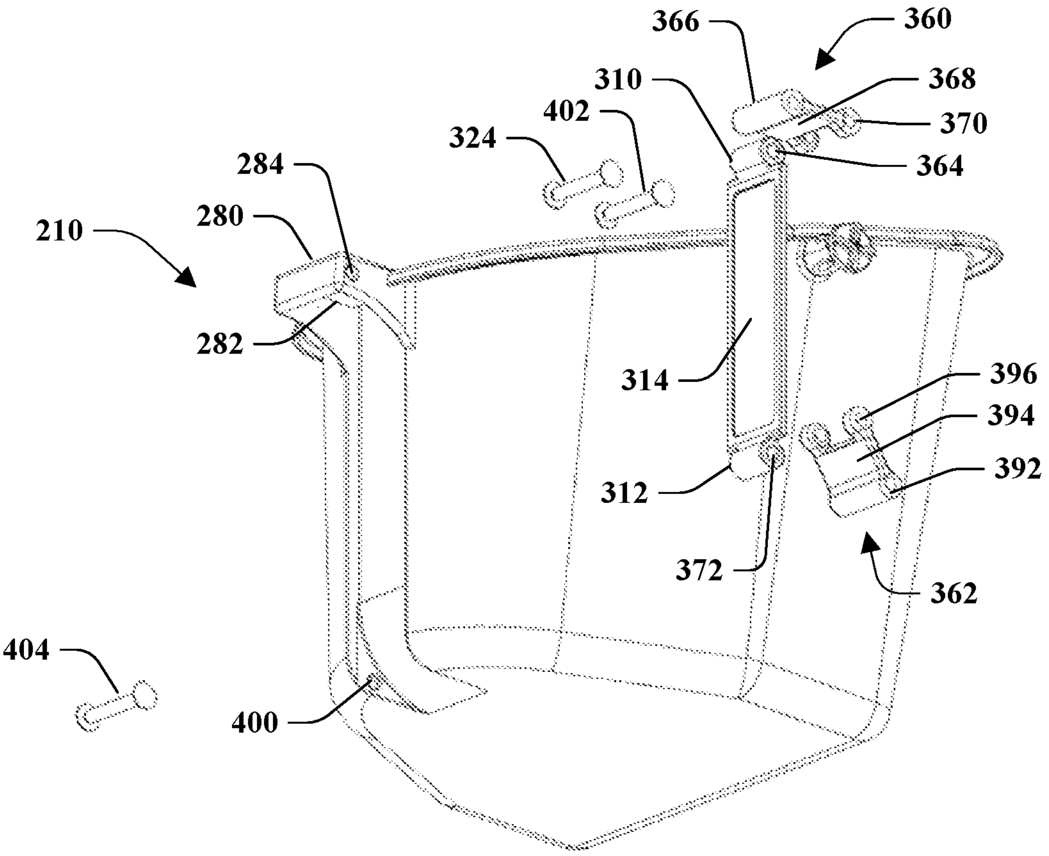
FIG. 22 is a rear exploded perspective view of the container.

The flexible band 224 is movable between a first position spaced a first distance from the rear 232, a second position spaced a second distance from the rear 232 less than the first distance to allow the rear 232 of the container body 220 and the bail 222 to be grasped without interference by the flexible band 224 as shown in FIG. 22, and a third position spaced a third distance from the rear 232 greater than the first distance to provide space for a user's hand between the rear 232 of the container body 220 and the flexible band 224 as shown in FIG. 21.

Referring now to the bail 222 in detail, the bail 222 includes a first end 330 configured to be rotatably attached to the ear 262, a second end 332 configured to be rotatably attached to the ear 264, and a body 334 disposed between the first and second ends 330 and 332. The bail also includes attachment portions 336 and 338 at the first and second ends 330 and 332 respectively. The attachment portions 336 and 338 are substantially circular having respective openings through which the ears 262 and 264 extend. Each attachment portion 336, 338 includes a plurality of circumferentially spaced tabs 344 and 346 respectively surrounding the openings that are configured to flex to allow the bail 222 to be attached to the ears. The bail 222 can additionally include an opening 352 in the body 334, as shown proximate a center of the bail 222, which is configured to receive a ladder hook to allow for hanging from a ladder.

Figure 19:
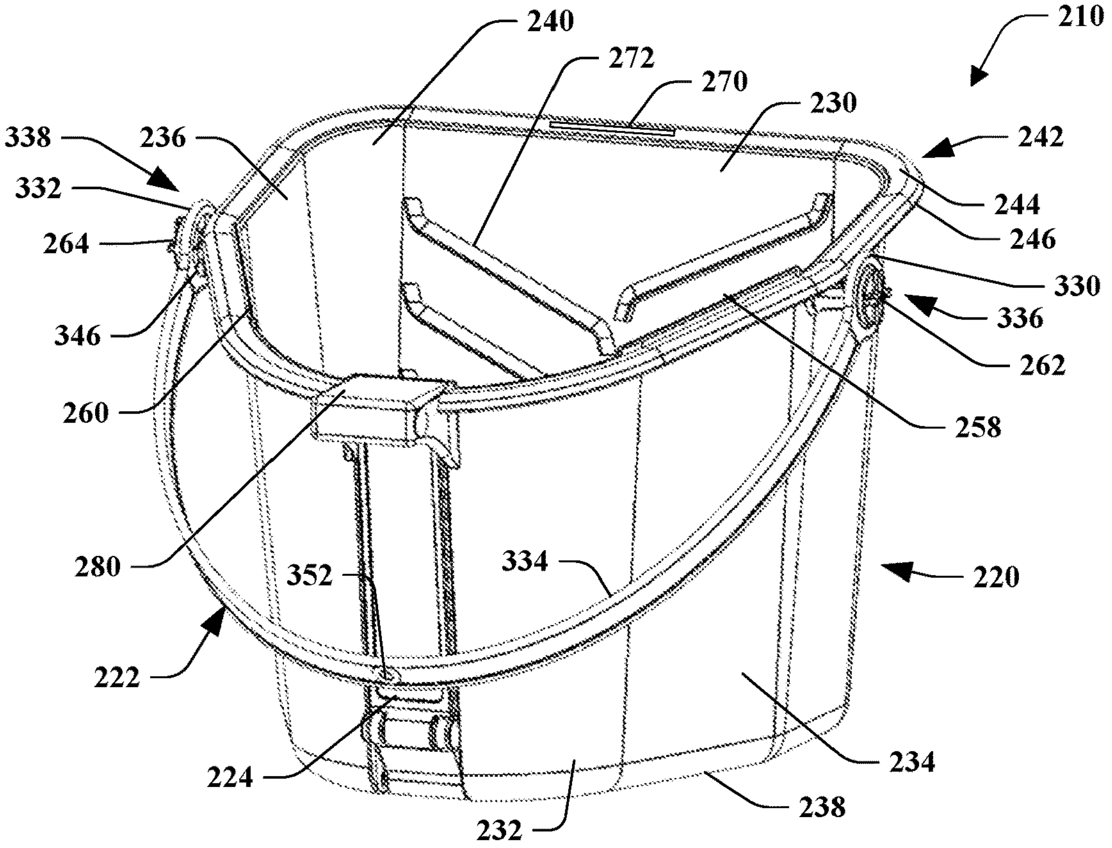
FIG. 19 is a perspective view of another exemplary container.
Figure 20:
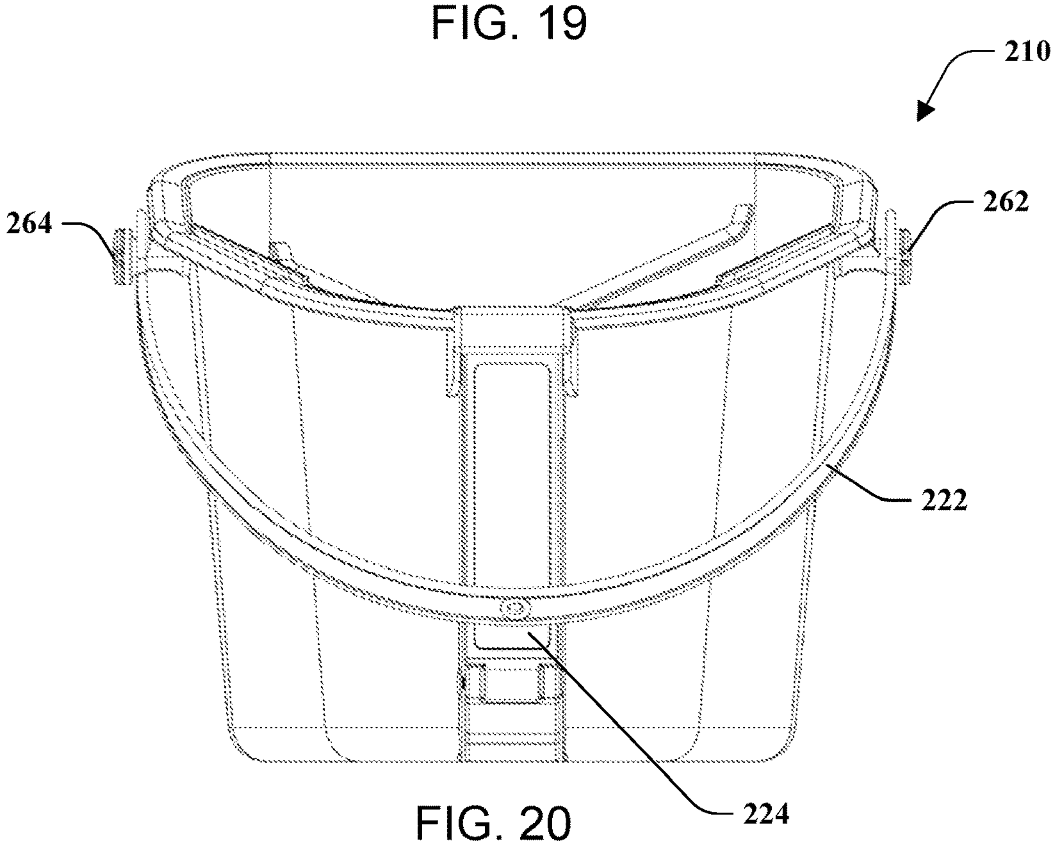
FIG. 20 is a rear view of the container.

The bail 222 is movable between a first position extending above the cavity 240 to allow the container 210 to be held by the bail 222, a second position behind the rear 232 of the container 210 as shown in FIG. 19 to allow the container to be held by the bottom 238 and rear 232 and be supported by the bail 222, and a third position in front of the front 230 of the container 210 as shown in FIG. 21 to allow the flexible band 224 to be utilized without interference by the bail 222 or to allow the container to be held by the bottom 238 and front 230 and be supported by the bail 222.

Turning now to FIGS. 23-26, an exemplary embodiment of the container is shown at 410. The container 410 is substantially the same as the above-referenced container 10, and consequently the same reference numerals but indexed by 400 are used to denote structures corresponding to similar structures in the containers. In addition, the foregoing description of the container 10 is equally applicable to the container 410 except as noted below.

The container 410 includes a container body 420, a bail 422 attached to the container body 420, and a flexible band 424 attached to the container body 420. The container body 420 includes a front 430, a rear 432, a right side 434, a left side 436, and a bottom 438 that define a cavity 440 for receiving the coating material. The front 430, rear 432, right side 434, and left side 436 each include a rim portion extending around tops thereof that is collectively referred to herein as an upper rim 442. The upper rim 442 includes a horizontal portion 444 and a downwardly projecting portion 446 outwardly spaced from the container body.

The right side 434 and left side 436 each include an inwardly extending portion 450, 452 proximate bottoms thereof that extend into the cavity 440 and define a ledge 454, 456 in the cavity 440 for holding the roller above a level of the coating material in the cavity 440. The inwardly extending portions 450 and 452 also provide an area of reduced width along an outside of the container 10 such that a user can grasp in one hand the right side 434 and left side 436 at the inwardly extending portions 450 and 452 to hold the container.

The right side 434 and left side 436 of the container 410 additionally include angled fronts where the sides meet the front 430 such that tops of the sides have a greater length than bottoms of the sides, bars 458 and 460 projecting upward from tops of the sides 434 and 436 that define regions to wipe off coating material, and ears 462 and 464 projecting outward from the sides to which the bail 422 is attached.

The front 430 of the container 410 is angled corresponding to the angle of the front of the left and right sides 434 and 436. The front 430 includes a slot 470 for receiving a ledge of a painting apparatus. The rear 432 of the container 410 includes a pair of slots 560 and 562 at the top of the rear and a slot at a bottom of the rear for attachment of the flexible band 424 as will be described in detail below. The bottom 438 of the container 410 is substantially T-shaped due to the inwardly extending portions 450 and 452. The cavity 440 is substantially T-shaped at and below the ledges 454 and 456 corresponding to the shape of the bottom 438, and has an irregular hexagon shape above the ledges 454 and 456.

Referring now to the flexible band 424 in detail, the flexible band 424 includes a first end 510 configured to be attached to the rear 432 proximate a top of the rear 432, a second end 512 configured to be attached to the rear 432 at a bottom of the rear 432, and a substantially planar portion 514 disposed between the first and second ends 510 and 512. The second end can be fixedly attached to the rear 432 at the bottom in a suitable manner, such as by looping the second end through the slot and attaching the second end to the planar portion 514 proximate the second end, by forming the second end to be larger than the slot, etc. The first end 510 can be adjustably attached to the rear 432 at the top in any suitable manner, such as by looping the first end through the slots 560 and 562. It will be appreciated that the first end 510 and second end 512 may be attached in any suitable manner, such as described above.

Figure 25:
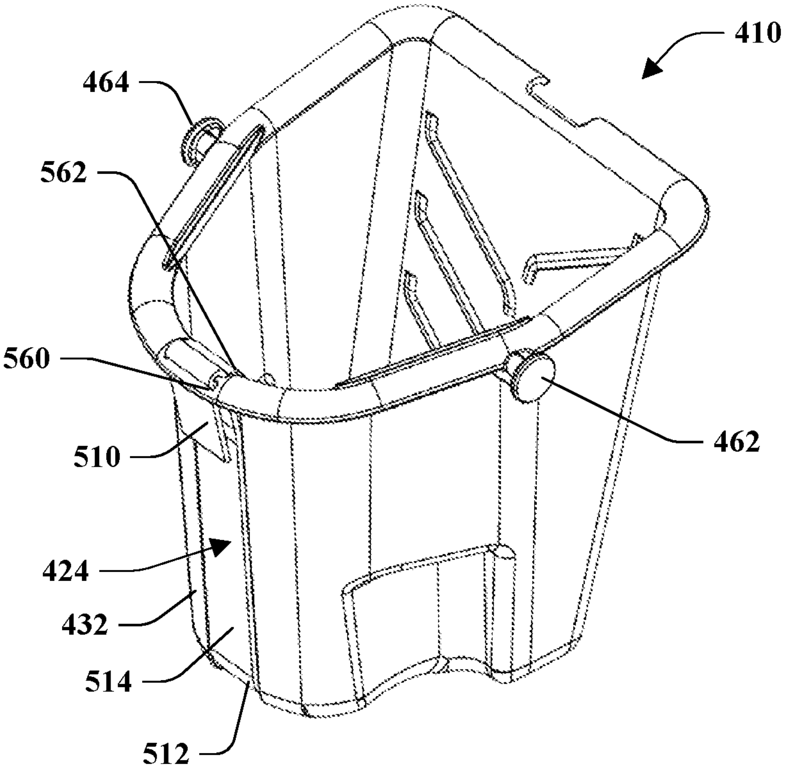
FIG. 25 is another perspective view of the container.
Figure 26:
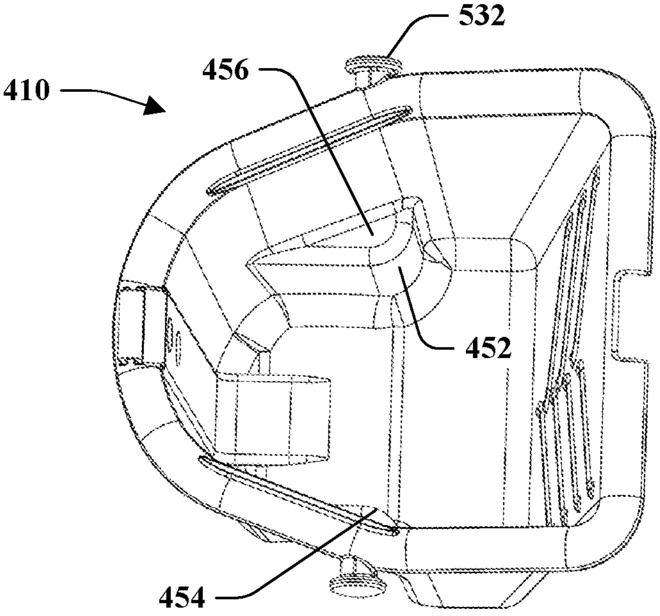
FIG. 26 is a top view of the container.

The flexible band 424 is movable between a first position spaced a first distance from the rear 432, a second position spaced a second distance from the rear 432 less than the first distance to allow the rear 432 of the container body 420 and the bail 422 to be grasped without interference by the flexible band 424 as shown in FIG. 25, and a third position spaced a third distance from the rear 432 greater than the first distance to provide space for a user's hand between the rear 432 of the container body 420 and the flexible band 424. It will be appreciated that the flexible band may be movable to a number of positions to adjust the space between the flexible band and the rear by tightening or loosening the flexible band, for example to adjust for the size of the user's hand.

Referring now to the bail 422 in detail, the bail 422 includes a first end 530 configured to be rotatably attached to the ear 462, a second end 532 configured to be rotatably attached to the ear 464, and a body 534 disposed between the first and second ends 530 and 532. The bail also includes attachment portions 536 and 538 at the first and second ends 530 and 532 respectively. The attachment portions 536 and 538 are substantially circular having respective openings through which the ears 462 and 464 extend. The bail 422 can include a slot extending from each opening respectively allowing the opening to be fitted over the ears, or can include tabs as discussed above. The bail 422 can additionally include an opening 552 in the body 534, as shown proximate a center of the bail 422, which is configured to receive a ladder hook to allow for hanging from a ladder.

Figure 23:
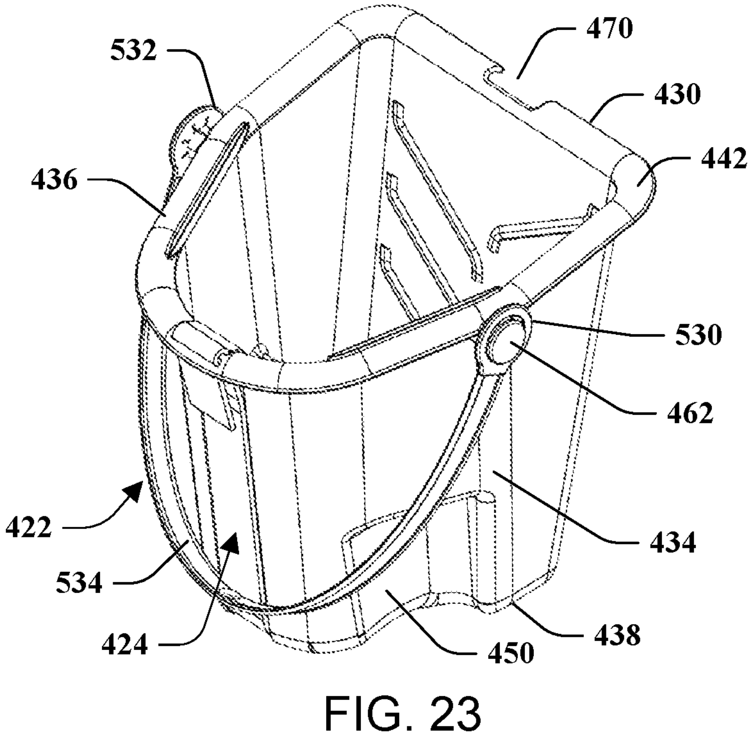
FIG. 23 is a perspective view of still another exemplary container.
Figure 24:
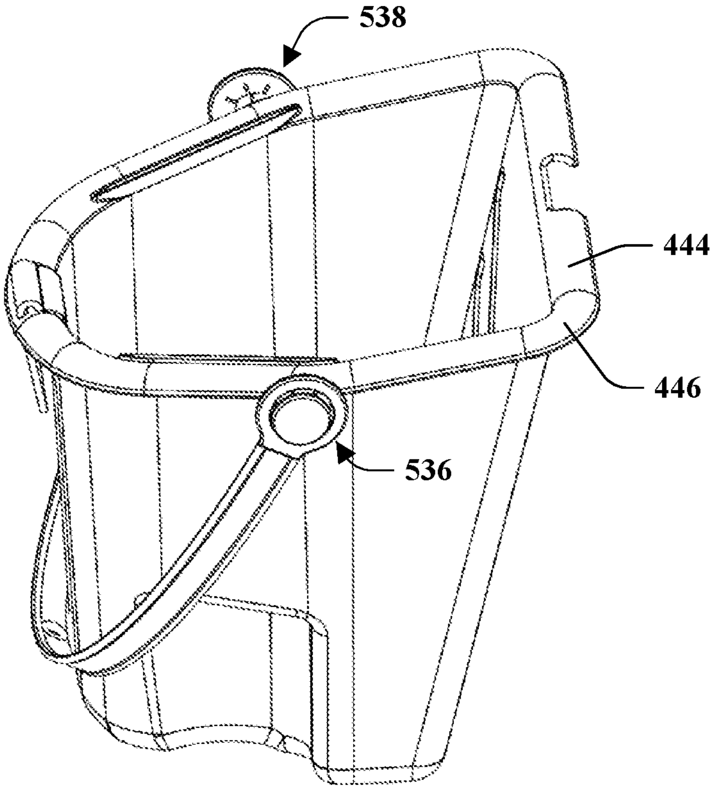
FIG. 24 is a top left side view of the container.

The bail 422 is movable between a first position extending above the cavity 440 as shown in FIG. 23 to allow the container 410 to be held by the bail 422, a second position behind the rear 432 of the container 410 as shown in FIG. 25 to allow the container to be held by the bottom 438 and rear 432 and be supported by the bail 422, and a third position in front of the front 430 of the container 410 as shown in FIG. 24 to allow the flexible band 424 to be utilized without interference by the bail 422 or to allow the container to be held by the bottom 438 and front 430 and be supported by the bail 422.

Figure 27:
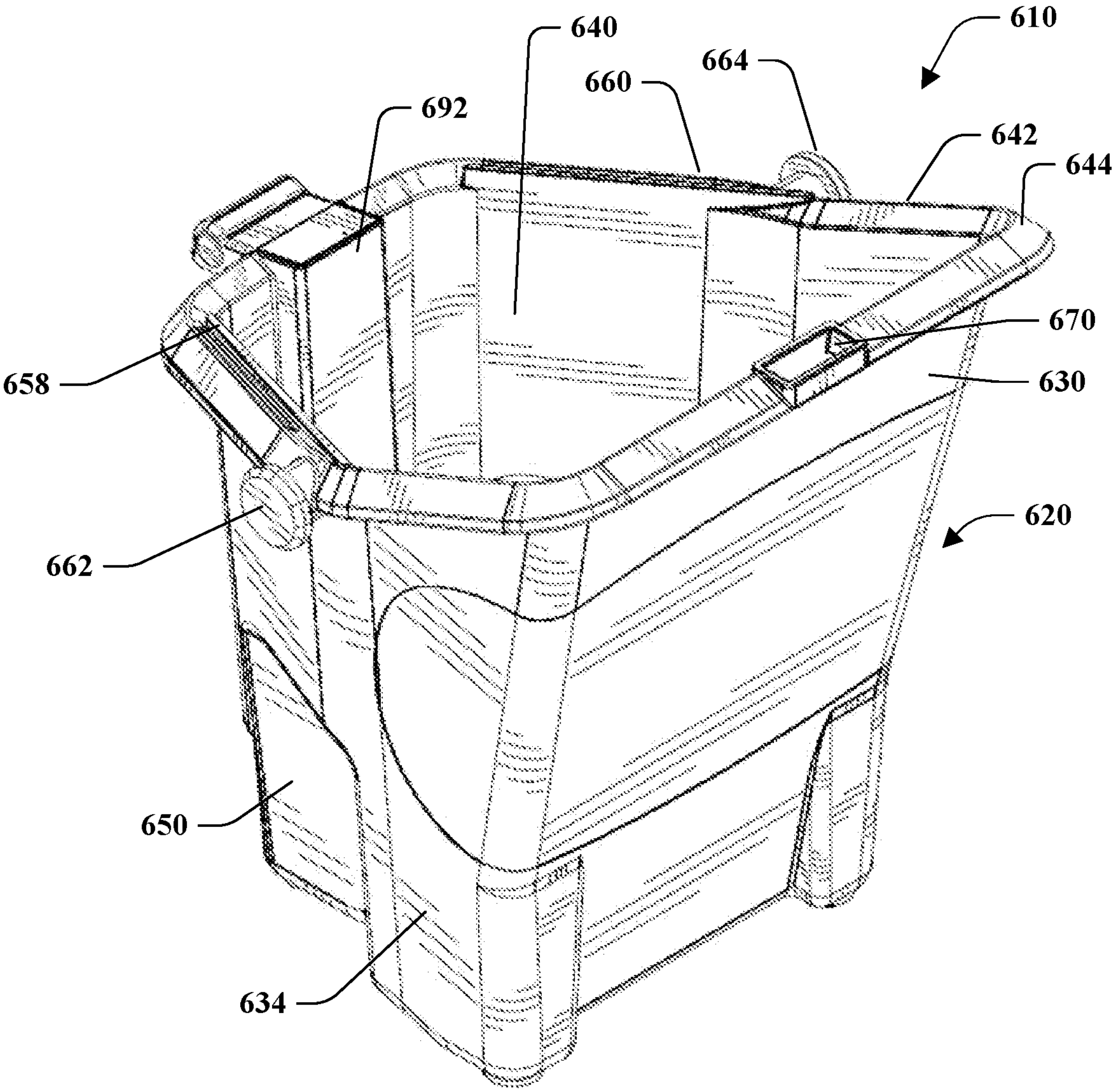
FIG. 27 is a perspective view of yet another exemplary container.
Figure 28:
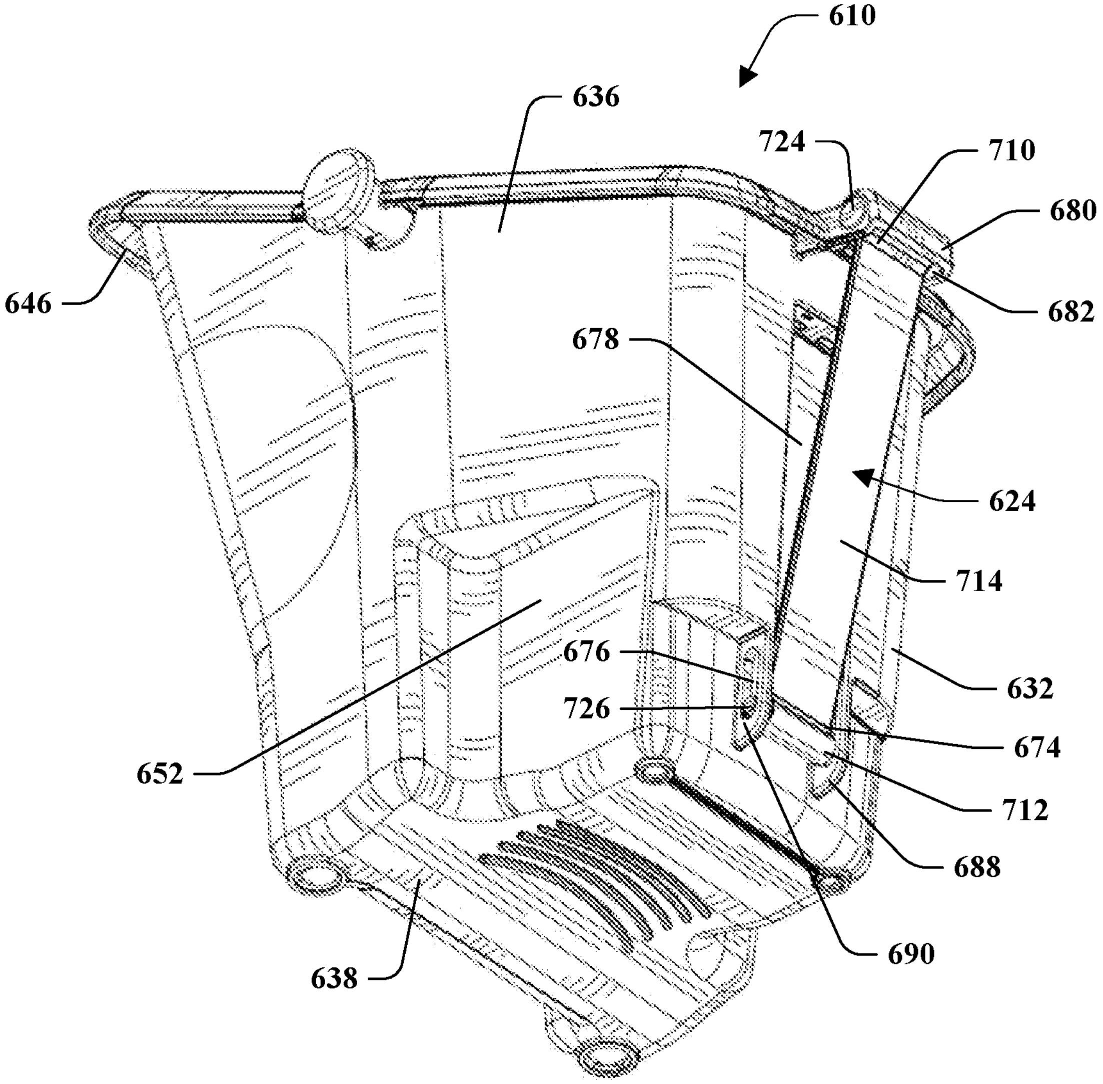
FIG. 28 is another perspective view of the container.
Figure 29:
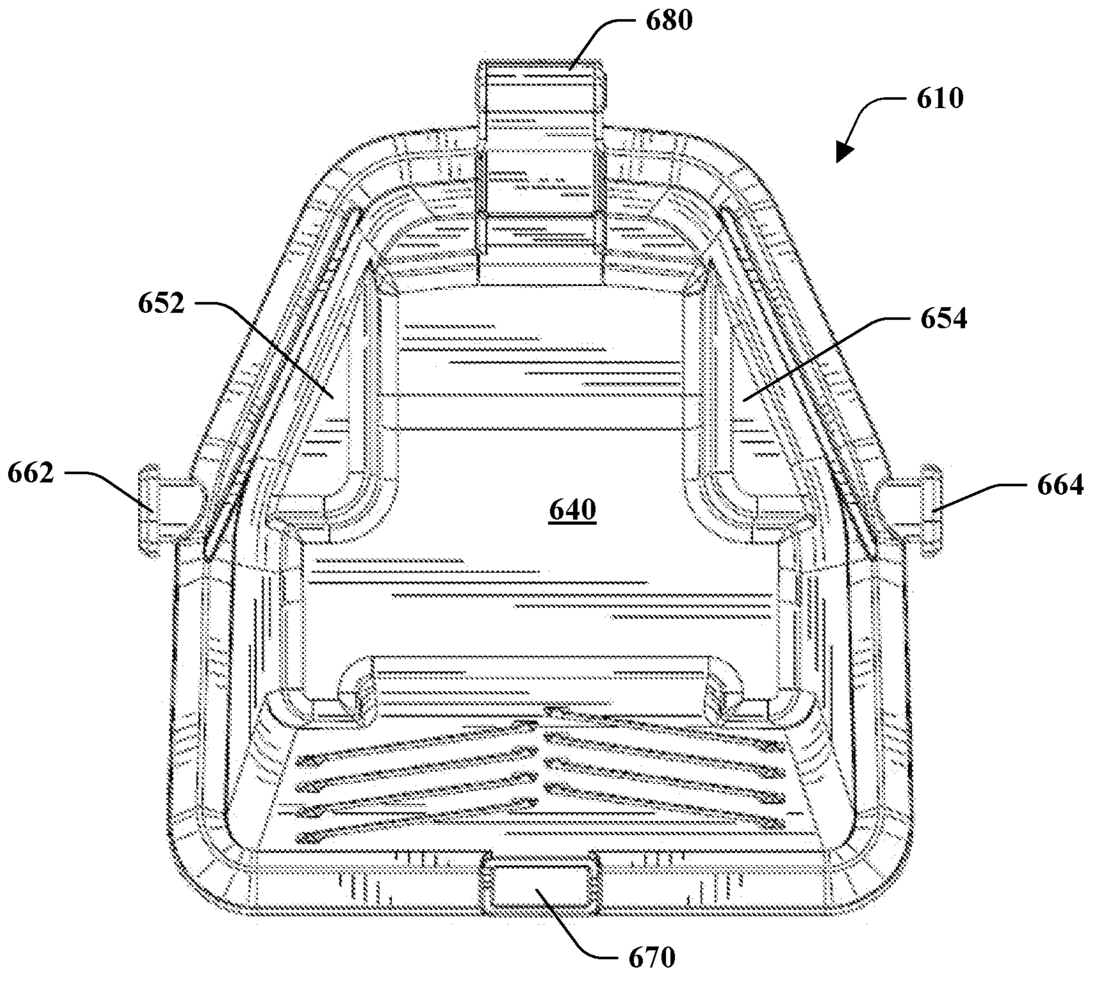
FIG. 29 is a top view of the container.

Turning now to FIGS. 27-29, an exemplary embodiment of the container is shown at 610. The container 610 is substantially the same as the above-referenced container 10, and consequently the same reference numerals but indexed by 600 are used to denote structures corresponding to similar structures in the containers. In addition, the foregoing description of the container 10 is equally applicable to the container 610 except as noted below.

The container 610 includes a container body 620, a bail (not shown) attached to the container body 620, and a flexible band 624 attached to the container body 620. The container body 620 includes a front 630, a rear 632, a right side 634, a left side 636, and a bottom 638 that define a cavity 640 for receiving the coating material. The front 630, rear 632, right side 634, and left side 636 each include a rim portion extending around tops thereof that is collectively referred to herein as an upper rim 642. The upper rim 642 includes a horizontal portion 644 and a downwardly projecting portion 646 outwardly spaced from the container body.

The right side 634 and left side 636 each include an inwardly extending portion 650, 652 proximate bottoms thereof that extend into the cavity 640 and define a ledge 654, 656 in the cavity 640 for holding the roller above a level of the coating material in the cavity 640. The inwardly extending portions 650 and 652 also provide an area of reduced width along an outside of the container 610 such that a user can grasp in one hand the right side 634 and left side 636 at the inwardly extending portions 650 and 652 to hold the container.

The right side 634 and left side 636 of the container 610 additionally include angled fronts where the sides meet the front 630 such that tops of the sides have a greater length than bottoms of the sides, bars 658 and 660 projecting upward from tops of the sides 634 and 636 that define regions to wipe off coating material, and ears 662 and 664 projecting outward from the sides to which the bail is attached.

The front 630 of the container 610 is angled corresponding to the angle of the front of the left and right sides 634 and 636. The front 630 includes an opening 670 for receiving a ledge of a painting apparatus.

The rear 632 of the container 610 includes a pair of opposed slots 674 and 676 proximate the bottom 638, a channel 678 extending substantially along the rear 632 for receiving the flexible band 624, and a projection 680 projecting rearwardly from the rear 632 that provides a surface for a user's thumb to rest. The projection 680 defines a cavity 682 for receiving an end of the flexible band 624, and includes openings at opposite ends thereof for attachment of the flexible band 624 to the projection 680. As shown, the slots 674 and 676 are in respective projections 688 and 690 that project from the rear 632 proximate the bottom 638 and the projection 680 projects from the rim portion of the rear 632. The container 610 can additionally include a projection 692 projecting forwardly from the rear 632 into the cavity 640. The projection 692 defines a cavity for housing a magnet for supporting the brush. The cavity may be sealed at the top by a cover or the like preventing removal of the magnet or sealed by the magnet.

The flexible band 624 includes a first end 710 configured to be rotatably attached to the rear 632 proximate a top of the rear 632, for example at the projection 680, and a second end 712 configured to be rotatably attached to the rear 632 proximate a bottom of the rear 632, for example at the opposed slots 674 and 676. The flexible band 624 also includes a substantially planar portion 714 disposed between first and second tubular portions at the first and second ends 710 and 712 respectively. A pin 724 or other suitable fastener is then inserted through the tubular portion at the first end 710 to attach the first end 710 of the flexible band 624 to the projection 680. Similarly the tubular portion at the second end 712 is positioned between the slots 674 and 676 in the projections 688 and 690 proximate the bottom 638 and a pin 726 or other suitable fastener is inserted through the through passage to attach the second end 712 of the flexible band 624 to the projections 688 and 690.

The aforementioned elements (e.g., container, bail, band, among others), and the like have been described with respect to interaction between several components and/or elements. It should be appreciated that such elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the subject matter, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A container comprising:

a container body having a front, a rear having slots and a projection projecting rearwardly from the rear proximate a top of the container body and providing a surface for a user's thumb to rest, a right side, a left side, and a bottom that define a cavity for receiving a coating material, the projection defining a cavity;

a fastener disposed in and movable within the slots; and a flexible band attached to the rear of the container body, the flexible band having a first end received in the cavity of the projection and attached to the rear of the container body to rotate in the cavity relative to the projection, and a second end attached to the fastener at the rear of the container body to move with the fastener, wherein the flexible band is movable between a first position spaced a first distance from the rear to allow the container body to be grasped at the rear, and a second position spaced a second distance from the rear greater than the first distance to provide space for a user's hand between the rear of the container body and the flexible band.

2. The container of claim 1, further comprising one or more projecting ribs that project from the bottom of the container body configured to provide a fingertip relief grip area.

3. The container according to claim 1, wherein the first end of the flexible band is attached proximate a top of the rear of the container body, and wherein the second end of the flexible band is attached proximate a bottom of the rear of the container body.

4. The container according to claim 1, wherein the flexible band is movable between a third position spaced a third distance from the rear, the third distance being between the first distance and the second distance.

5. The container according to claim 1, wherein the first and second ends of the flexible band are each configured to remain attached to the rear of the container body when the flexible band is moved between the first and second positions.

6. The container according to claim 1, wherein the projection includes a passage therethrough, and wherein the first end of the flexible band is attached to a first fastener that extends through the passage to allow the flexible band to rotate relative to the projection.

7. The container according to claim 1, further comprising a bail attached to the container body, wherein the bail is configured to support the user's thumb.

8. The container according to claim 7, further including a first ear extending from the left side and a second ear extending from the right side, wherein the bail has a first end attached to the first ear and a second end attached to the second ear.

9. A container for holding a coating material, the container comprising:

a container body having a front, a rear having slots proximate a bottom of the rear and a projection projecting rearwardly from the rear of the container body proximate a top of the container body, a right side, a left side, and a container bottom that define a cavity for receiving a coating material;

a bail attached to the container body;

a first fastener attached to the projection;

a second fastener disposed in and movable within the slots; and a flexible band attached to the rear of the container body, the flexible band having a first end attached to the first fastener proximate a top of the rear to rotate relative to the projection about the first fastener and a second end attached to the second fastener proximate the bottom of the rear to move with the second fastener within the slots.

10. The container of claim 9, further comprising one or more projecting ribs that project from the bottom of the container body configured to provide a fingertip relief grip area.

11. The container according to claim 9, wherein the flexible band is movable between a first position spaced a first distance from the rear, a second position spaced a second distance from the rear less than the first distance to allow the container body and the bail to be grasped at the rear without interference by the flexible band, and a third position spaced a third distance from the rear greater than the first distance to provide space for a user's hand between the rear of the container body and the flexible band.

12. The container according to claim 9, wherein the flexible band is movable between a first position, a second position, and a third position, wherein when the flexible band is in the second position, the rear of the container body and the bail are configured to be grasped by a user's hand without interference by the flexible band.

13. The container of claim 9, wherein the second fastener is movable within the slots in a vertical direction extending from the bottom of the container body toward a top of the container body.

14. A method for holding a container for a coating material, the container including a container body having a front, a rear, a right side, a left side, and a bottom that define a cavity for receiving the coating material, a bail attached to the container body and movable between a first bail position extending above the cavity, a second bail position behind the rear, and a third bail position in front of the front, and a flexible band comprising first and second ends that are attached to a rear of the container body, wherein at least the first end or the second end is attached to a fastener at the rear of the container body, wherein the flexible band is movable between a first band position spaced a first distance from the rear, a second band position spaced a second distance from the rear less than the first distance, and a third band position spaced a third distance from the rear greater than the first distance, the method including:

moving the flexible band to the second band position adjacent the rear of the container and moving the bail to the second bail position behind the rear and holding the container body and bail at the rear;

moving the bail to the third bail position and holding the container body and bail at the front; and moving the flexible band to the third band position and inserting a user's fingers between the flexible band and the rear of the container body.

15. The method of claim 14, wherein the first end of the flexible band is attached to a first fastener, wherein the second end of the flexible band is attached to a second fastener, and wherein the first and second ends of the flexible band remain attached to the rear of the container body by the first and second fasteners as the flexible band is moved between the first, second, and third band positions.

16. The method of claim 14, wherein the container further includes one or more projecting ribs that project from the bottom of the container body configured to provide a fingertip relief grip area for holding the container body when the flexible band is in the second band position and when the bail is in the second bail position.

17. The method of claim 14, wherein the container body includes a projection projecting rearwardly from the rear of the container body proximate a top of the container body and providing a surface for a user's thumb to rest when the flexible band is in the third band position, and wherein the projection defines a cavity configured to receive the flexible band when the flexible band is in the second band position.

* * * * *